US006694357B1

(12) United States Patent
Volnak

(10) Patent No.: US 6,694,357 B1
(45) Date of Patent: *Feb. 17, 2004

(54) ACCESSING, VIEWING AND MANIPULATION OF REFERENCES TO NON-MODIFIABLE DATA OBJECTS

(75) Inventor: Will Volnak, Felton, CA (US)

(73) Assignee: Copernican Technologies, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 59 days.

(21) Appl. No.: 09/109,135

(22) Filed: Jul. 2, 1998

(51) Int. Cl.[7] .............................................. G06F 15/16
(52) U.S. Cl. ............................ 709/218; 707/8; 707/10; 345/826; 345/853; 345/776; 345/738; 345/751; 715/513; 715/515; 715/530
(58) Field of Search ................................. 709/218, 219, 709/203, 328, 310; 707/10, 8, 513; 345/776, 738, 739, 826, 853, 751; 715/513, 515, 530

(56) References Cited

U.S. PATENT DOCUMENTS

| | | | | |
|---|---|---|---|---|
| 5,206,951 A | * | 4/1993 | Khoyi et al. ................ 709/303 |
| 5,408,655 A | * | 4/1995 | Oren et al. ................. 707/501 |
| 5,428,778 A | * | 6/1995 | Brookes ........................ 707/5 |
| 5,435,004 A | * | 7/1995 | Cox et al. .................... 707/205 |
| 5,446,575 A | * | 8/1995 | Lysakowski, Jr. ......... 707/104.1 |
| 5,446,891 A | * | 8/1995 | Kaplan et al. ................ 707/2 |
| 5,491,820 A | | 2/1996 | Belove et al. ............... 395/600 |
| 5,523,942 A | * | 6/1996 | Tyler et al. ..................... 705/4 |
| 5,592,073 A | * | 1/1997 | Redlich ....................... 323/300 |
| 5,623,652 A | * | 4/1997 | Vora et al. ..................... 707/10 |
| 5,623,659 A | * | 4/1997 | Shi et al. ......................... 707/8 |
| 5,632,022 A | * | 5/1997 | Warren et al. ............... 345/350 |
| 5,649,186 A | * | 7/1997 | Ferguson ..................... 707/10 |
| 5,694,594 A | * | 12/1997 | Chang ............................ 707/6 |
| 5,706,502 A | * | 1/1998 | Foley et al. .................. 707/10 |
| 5,708,825 A | | 1/1998 | Sotomayor .................. 395/762 |
| 5,717,923 A | | 2/1998 | Dedrick ....................... 395/613 |
| 5,717,925 A | * | 2/1998 | Harper et al. ............... 707/102 |

(List continued on next page.)

FOREIGN PATENT DOCUMENTS

WO 96/23265 * 8/1996

OTHER PUBLICATIONS

Jasper: Communicating Information Agents for WWW, Davies et al., British Telcom, First Published Jan. 1996.*

(List continued on next page.)

*Primary Examiner*—Hugh Jones
*Assistant Examiner*—W. Thomson
(74) *Attorney, Agent, or Firm*—Bingham McCutchen LLP; Fabio E. Marino; Jeffrey S. Smith

(57) ABSTRACT

A method and apparatus are provided for accessing, viewing and manipulating data stored in a computer system. This is achieved by selecting one or more of the non-modifiable data objects stored in a computer system, creating references to the selected objects and adding the references to a reference list. The reference list is then manipulated to allow a user to add to, remove from or search the references in the reference list. In some embodiments, different operations are performed by different computers connected to a computer network such as the Internet. In such cases, data objects are stored on a server computer and searched by client computers connected to the server computer over the network. A reference list is stored on the client computers and can be directly manipulated by the user without a need for further interaction with the server computer.

18 Claims, 22 Drawing Sheets

U.S. PATENT DOCUMENTS

| | | | |
|---|---|---|---|
| 5,721,897 A | | 2/1998 | Rubinstein .................. 395/602 |
| 5,727,175 A | | 3/1998 | Malone et al. .............. 395/356 |
| 5,727,950 A | * | 3/1998 | Cook et al. ................. 345/854 |
| 5,737,599 A | | 4/1998 | Rowe et al. ................ 395/615 |
| 5,761,656 A | | 6/1998 | Ben-Shachar .................. 707/4 |
| 5,761,662 A | * | 6/1998 | Dasan ......................... 707/10 |
| 5,778,367 A | * | 7/1998 | Wesinger, Jr. et al. ........ 707/10 |
| 5,781,189 A | * | 7/1998 | Holleran et al. ............ 345/826 |
| 5,781,785 A | | 7/1998 | Rowe et al. |
| 5,784,619 A | * | 7/1998 | Evans et al. ................ 709/218 |
| 5,794,233 A | | 8/1998 | Rubinstein ..................... 707/4 |
| 5,802,518 A | * | 9/1998 | Karaev et al. ................. 707/9 |
| 5,819,032 A | * | 10/1998 | Vries et al. ................. 709/250 |
| 5,835,905 A | * | 11/1998 | Pirolli et al. .................... 707/3 |
| 5,838,326 A | * | 11/1998 | Card et al. ................. 345/355 |
| 5,842,206 A | * | 11/1998 | Sotomayor ..................... 707/5 |
| 5,845,278 A | * | 12/1998 | Kirsch et al. .................. 707/3 |
| 5,893,109 A | * | 4/1999 | DeRose et al. ............ 707/104 |
| 5,907,843 A | * | 5/1999 | Cleron et al. ................. 707/10 |
| 5,913,215 A | * | 6/1999 | Rubinstein et al. ........... 707/10 |
| 5,929,852 A | * | 7/1999 | Fisher et al. ................ 345/739 |
| 5,931,907 A | * | 8/1999 | Davies et al. ................ 709/218 |
| 5,978,828 A | * | 11/1999 | Greer et al. ............... 709/2.24 |
| 5,987,480 A | * | 11/1999 | Donohue et al. ........... 707/501 |
| 6,006,227 A | | 12/1999 | Freeman et al. ................ 707/7 |
| 6,049,664 A | * | 4/2000 | Dale et al. .................. 717/174 |
| 6,209,128 B1 | * | 3/2001 | Gerard et al. ................. 717/11 |
| 6,272,673 B1 | * | 8/2001 | Dale et al. .................. 717/100 |
| 6,486,895 B1 | * | 11/2002 | Robertson et al. .......... 345/776 |
| 6,544,295 B1 | * | 4/2003 | Bodnar ....................... 709/219 |

OTHER PUBLICATIONS

"Agent Based Design of Distributed Hypertext", Dattolo et al., 1996.*

Goldberg, D. et al.: "Using Collaborative Filtering to Weave an Information Tapestry" Communications of the Association for Computing Machinery, Association for Computing Machinery. New York, US, vol. 35, No. 12, Dec. 1, 1992, pp. 61–70, XP000334368, ISSN: 0001–0782.

Jühne, J. et al.: "Ariadne: a Java–based guided tour system for the World Wide Web" Computer Networks and ISDN Systems, North Holland Publishing. Amsterdam, NL, vol. 30, No. 1–7, Apr. 1, 1998, pp. 131–139, XP004121433, ISSN: 0169–7552.

Maltz, D. et al.: "Pointing The Way: Active Collaborative Filtering" Human Factors in Computing Systems. CHI '95 Conference Proceedings. Denver, May 7–11, 1995, Conference on Human Factors in Computing Systems, New York, ACM, US, May 7, 1995, pp. 202–209, XP000538449, ISBN: 0–201–84705–1.

Röscheisen, M. et al.: "Beyond browsing: shared comments, SOAPs, trails, and on–line communities" Computer Networks and ISDN Systems, North Holland Publishing. Amsterdam, NL, vol. 27, No. 6, Apr. 1, 1995, pp. 739–749, XP004013176, ISSN: 0169–7552.

* cited by examiner

| Doe, John | 987-5768 | 25 Pine Blvd. |
|---|---|---|
| Roe, Jane | 243-5768 | 2657 1st St. #322 |
| Roe, John | 423-1251 | 1423 Sunset Ln. |
| Smith, John | 786-2312 | 1 California Ave. |

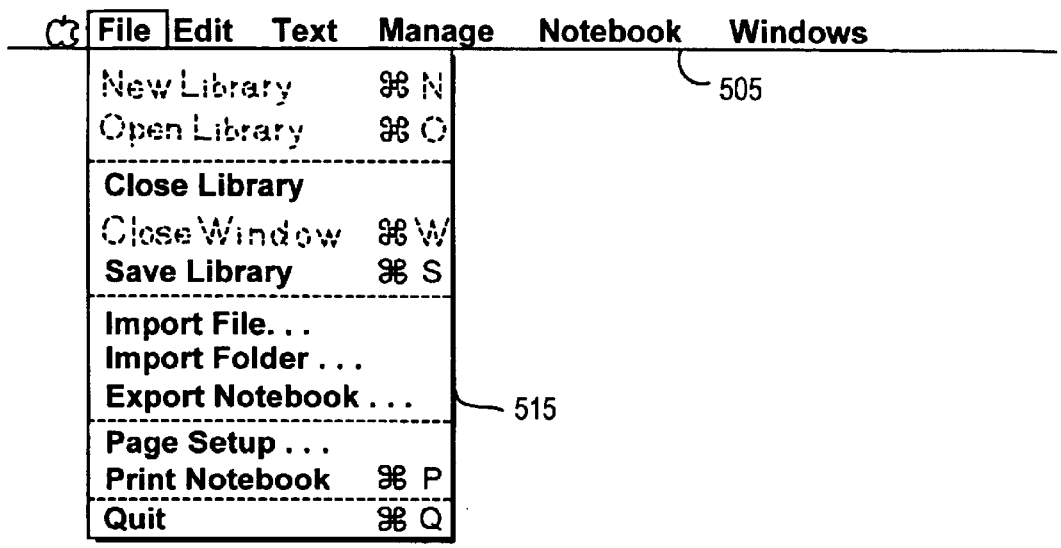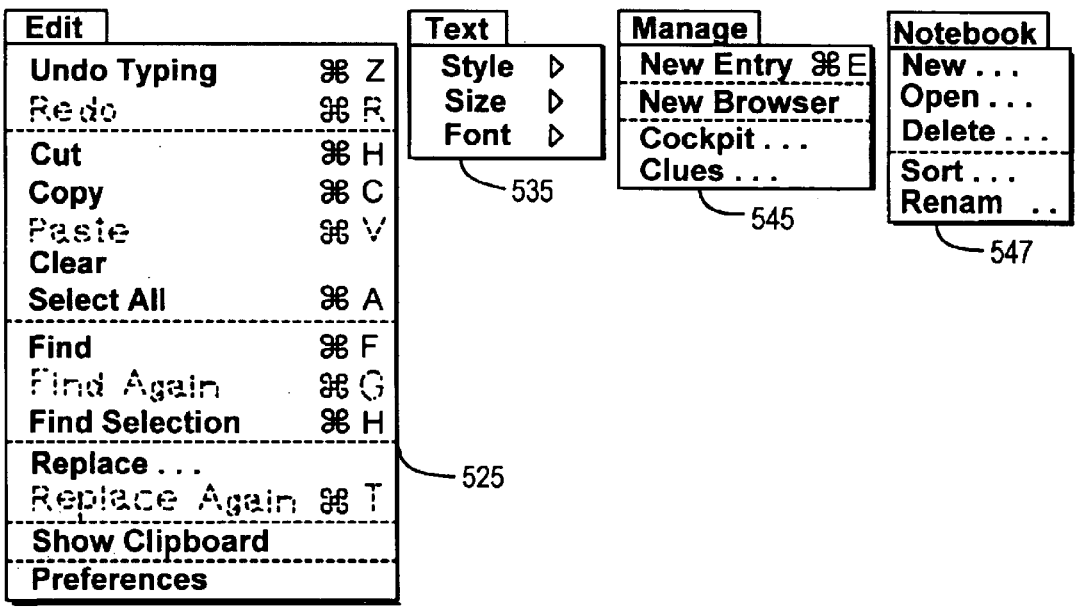
Fig. 5A

Browser: Cockpit

Total: 30  Sorted: Source Ascending

| Slot | Title | Tag | Created | Source |
|---|---|---|---|---|
| 1 | Entry Format Defined | IMPORTED | 98-04-1014:10 | actions:Entry Format Defi |
| 2 | Entry Reformat Defined | IMPORTED | 98-04-1014:10 | actions:Entry Reformat D |
| 3 | Entry Reformat Explained | IMPORTED | 98-04-1014:10 | actions: Entry Reformat E |
| 4 | Exporting Defined | IMPORTED | 98-04-1014:10 | actions: Exporting Define |
| 5 | Importing Defined | IMPORTED | 98-04-1014:10 | actions: Importing Defined |
| 6 | Put Defined | IMPORTED | 98-04-1014:10 | actions: Put Defined |
| 7 | Put Explained | IMPORTED | 98-04-1014:10 | actions: Put Explained |

Title: Exporting Defined  Tag: IMPORTED

Source: actions:Exporting Defined  98-04-1014:10 / 98-04-1014:13 term glossary Exporting verbs Cockpit

Exporting: make a copy of an Entry or a Notebook as a Mac text file for use by other applications. Boswell (42) only supports text exporting at the present time.

All Alphabetic actions
Browser
Clone
Clue
Cockpit
data_items
e-mail
Entry
entry_header
Exporting
features
feedback
Fluid_Entries
Format
Freezing
Frozen_Entries
future
glossary
Importing
interface
Journal
Library
Limitations
menu_description

Walden Library — WLD01 Economy

| | Total: 8 | | Sorted: | Title Ascending | |
|---|---|---|---|---|---|
| | Slot | Title | Tag | Created | Source |
| | 1 | WLD01-01 Sojourner | WALDEN | 98-06-04 17:11 | User |
| | 2 | WLD01-02 Obtrude | WALDEN | 98-06-04 17:23 | Thoreau |
| | 3 | WLD01-03 Your Condition | WALDEN | 98-06-04 17:27 | Thoreau |
| | 4 | WLD01-04 Inherited Farms | WALDEN | 98-06-04 17:30 | Thoreau |
| | 5 | WLD01-05 | WALDEN | 98-06-04 17:33 | Thoreau |
| | 6 | WLD01-06 Bloom on Fruits | WALDEN | 98-06-04 17:35 | Thoreau |
| | 7 | WLD01-07 Making Yourselves Sick | WALDEN | 98-06-04 17:36 | Thoreau |

Title: WLD01-01 Sojourner   Tag: WALDEN

Source: User   98-06-04 17:11 / 98-06-04 17:14

One of the most famous openings in American Literature.

When I wrote the following pages, or rather the bulk of them, I lived alone, in the woods, a mile from any neighbor, in a house which I had build myself, on the shore of Walden Pond, in Concord, Massachusetts, and earned my living by the labor of my hands only. I lived there two years and two months. At the present I am a sojourner in civilized life again.

Notebooks

Author
- Walden Complete
- WLD00 Contents
- WLD01 Economy
- WLD02 Where
- WLD03 Reading
- WLD04 Sounds
- WLD05 Solitude
- WLD06 Visitors
- WLD07 Bean-Field
- WLD08 Village Reader
- Boyhood Refs
- Goose Refs
- Poetry
- Pond Refs
- Railroad Refs
- Quotations
- School refs

Fig. 10 A

HyperBrowser: The Harvard Thoreau Project Walden Library

Location: http://www.harvard.edu/literature/us/libraries/thoreau/walden.lib

WLD01 Economy

Sorted: Title Ascending

Total: 8

| Slot | Title | Tag | Created | Source |
|---|---|---|---|---|
| 1 | WLD01-01 Sojourner | WALDEN | 98-06-04 17:11 | User |
| 2 | WLD01-02 Obtrude | WALDEN | 98-06-04 17:23 | Thoreau |
| 3 | WLD01-03 Your Condition | WALDEN | 98-06-04 17:27 | Thoreau |
| 4 | WLD01-04 Inherited Farms | WALDEN | 98-06-04 17:30 | Thoreau |
| 5 | WLD01-05 | WALDEN | 98-06-04 17:33 | Thoreau |
| 6 | WLD01-06 Bloom on Fruits | WALDEN | 98-06-04 17:35 | Thoreau |
| 7 | WLD01-07 Making Yourselves Si | WALDEN | 98-06-04 17:36 | Thoreau |

Title: WLD01-01 Sojourner    Tag: WALDEN
Source: User                  98-06-04 17:11 / 98-06-04 17:14

One of the most famous openings in American Literature.

When I wrote the following pages, or rather the bulk of them, I lived alone, in the woods, a mile from any neighbor, in a house which I had built myself, on the shore of Walden Pond, in Concord, Massachusetts, and earned my living by the labor of my hands only. I lived there two years and two months. At the present I am a sojourner in civilized life again.

Notebooks

Author
Walden Comple
WLD00 Content
WLD01 Econom
WLD02 Where
WLD03 Reading
WLD04 Sounds
WLD05 Solitude
WLD06 Visitors
WLD07 Bean-Fi Reader
Boyhood Refs
Goose Refs
Poetry
Pond Refs
Railroad Refs
Quotations
School Refs

Libraries

Academy Awards
Doonesbury
Dublin Pubs
Fullerania
Gogarty
Harvard Alumni
Jimenez
Joyce
Leopardi
Literary Quotations
National Geograph
Proust
Scientific American
Shakespeare
Spice Girls History
Superman Comics
Thoreau
Twain
USER
Wozniak
Yeats

Fig. 11

ACCESSING, VIEWING AND MANIPULATION OF REFERENCES TO NON-MODIFIABLE DATA OBJECTS

BACKGROUND OF THE INVENTION

1. Field of the Invention

The present invention relates generally to computer systems and, in particular, to accessing, viewing and manipulating archived information in a computer system.

2. Related Art

Systems that allow users to store and retrieve information in a computer system, such as database management systems, are well known. A database is a collection of data arranged according to a predefined structure. A telephone book is a classic example of a database containing a listing of telephone service subscribers, their respective telephone numbers and, optionally, their addresses. The data stored in such a database is organized in a structure 100 having three fields: a subscriber name field 110, a subscriber telephone number field 120 and a subscriber address field 130, as shown in FIG. 1A. Records 150 are copies of structure 100 that contain information specific to individual telephone subscribers. Multiple records 150 are stored in database 140, as shown in FIG. 1B.

Database management systems typically provide means for searching the database to retrieve a portion of the records stored in the database that satisfy certain search parameters. These searches are generally referred to as queries. Using the telephone book database of FIG. 1B as an example, one could search for all records in which the telephone subscriber has a certain address, or for all records in which the user has a certain name or, or for all records in which the user has a certain name and a certain address. Typically, however, database management systems do not allow users to manipulate the results of the queries, although some database management systems allow users to sort the order in which the records returned by a query are displayed. Other systems allow users to combine multiple search parameters in a single query; however, this approach still requires a new search to be performed. Accordingly, there is a need for a computer information system that allows results of searches to be manipulated and stored for future use, without requiring a new search to be performed.

Furthermore, current global network information systems, such as the World Wide Web, allow user to retrieve information stored on different host computers connected to a global network (e.g., the Internet). The World Wide Web is described on pages 681–723 of "Computer Networks" by Andrew S. Tanenbaum (Englewood Cliffs, N.J.: Prentice-Hall, Inc. 3rd ed. 1996), which are herein incorporated by reference in their entirety. The information stored on the World Wide Web, for example, is organized in a plurality of web pages. Each web page contains information in different formats, including multimedia. In addition, each web page may contain "links" to a other web pages. A user typically accesses the web pages through a web browser (i.e., a program executed by a computer connected to a global network that is able to retrieve and display data organized in web pages) by specifying an http address of a given web page. A user can then access other web pages either by specifying their http address or by "following a link" (i.e., clicking a hypertext field on a web page currently displayed by the web browser). This process is generally referred to as "navigating" or "surfing" the World Wide Web.

Users, however, cannot generally modify web pages to discard irrelevant information. In addition, currently available web browsers do not provide facilities for easily storing and manipulating a collection of links without interrupting the current search operation or performing a new search. Typically, web browsers employ a search engine to search the World Wide Web for web pages that meet the parameters of the search. Search engines then generate one or more web pages containing links to the web pages that meet the parameters of the search. The web browser, in turn, displays the web pages generated by the search. Thus, there is no easy way of manipulating the list of links contained in the web pages generated by the search engine. Accordingly, there is a need for a more flexible and faster method of organizing, searching and manipulating data than is currently available.

SUMMARY OF THE INVENTION

The present invention provides a method and apparatus for accessing, viewing and manipulating data stored in a computer system. This is achieved by selecting one or more of the non-modifiable data objects stored in a computer system, creating references to the selected data objects and adding the references to a reference list. The reference list is then manipulated to allow a user to add to, remove from or search the references in the reference list.

Furthermore, the invention provides a method and apparatus for accessing, viewing and manipulating data stored in a computer system in which different operations are performed by different computers connected to a computer network. This is particularly advantageous for Internet related applications in which data objects are stored on a server computer and searched by client computers connected to the server computer over the Internet. A reference list is stored on the client computers and can be directly manipulated by the user without a need for further interaction with the server computer.

BRIEF DESCRIPTION OF THE DRAWING

FIG. 5A shows the menu structure of a software application program, according to an embodiment of the invention.

FIG. 7 illustrates a browser window of a software application program, according to an embodiment of the invention.

FIG. 11 shows a window of a software application program that allows references to data entries to be accessed over a global network, according to an embodiment of the invention.

DETAILED DESCRIPTION OF THE INVENTION

A method and apparatus are provided for accessing, viewing and manipulating a wide variety of data objects stored in a computer system. Unlike in a database management system, data objects stored in the computer system can be searched or selected and the results of the search/selection can be freely manipulated. In addition, since the data objects are non-modifiable, the chronology of the data objects is preserved automatically and the task of maintaining references to the data objects is greatly simplified.

Figures 1A, 1B:
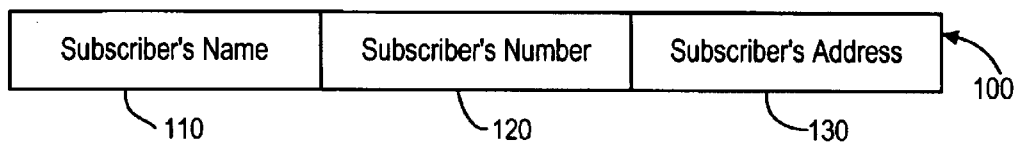
FIG. 1A illustrates the structure of a record of a prior art telephone book database.
FIG. 1B shows a prior art telephone book database having a plurality of records.
Figure 2:
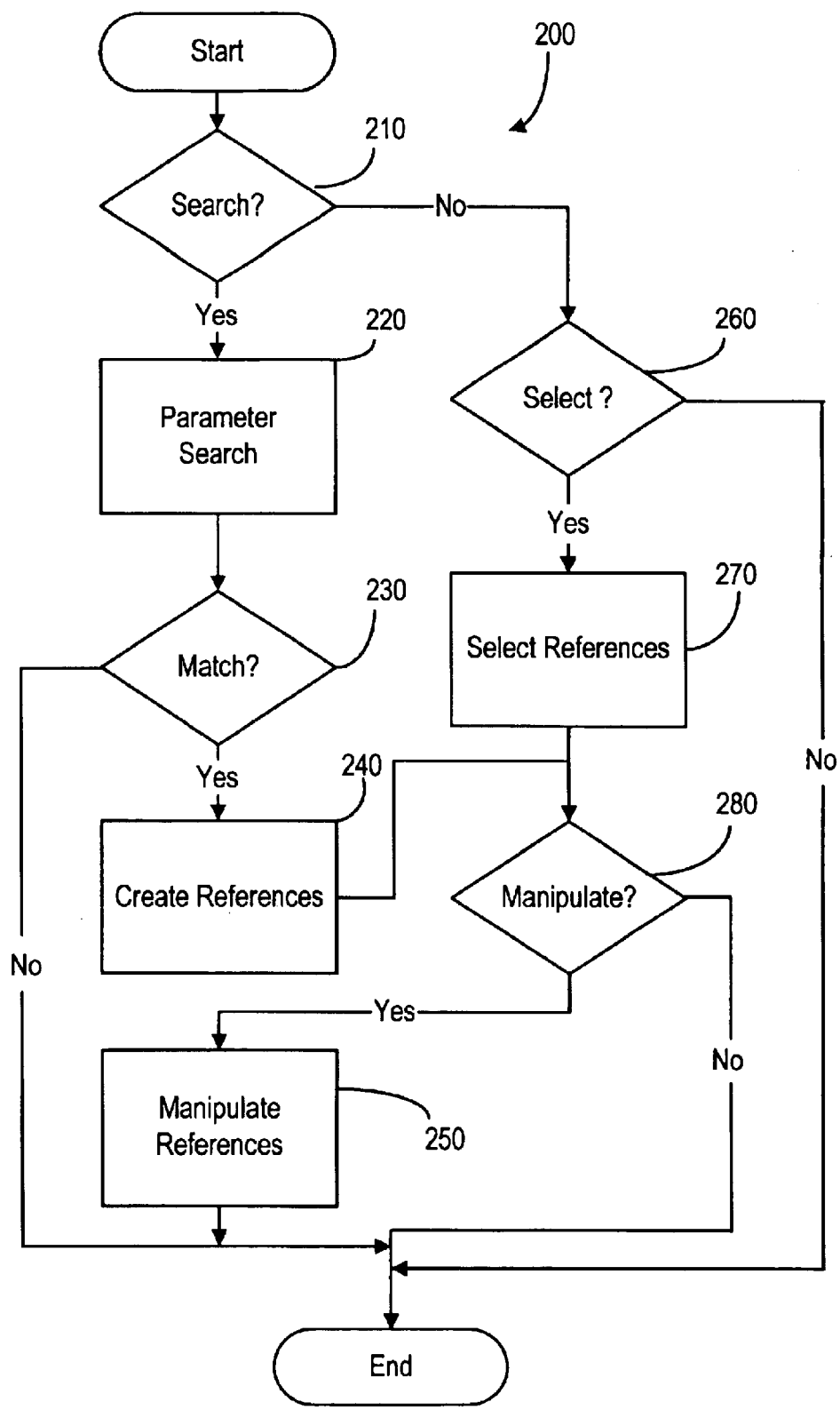
FIG. 2 is a flow diagram of a data manipulation operation, according to an embodiment of the invention.
Figure 6A:
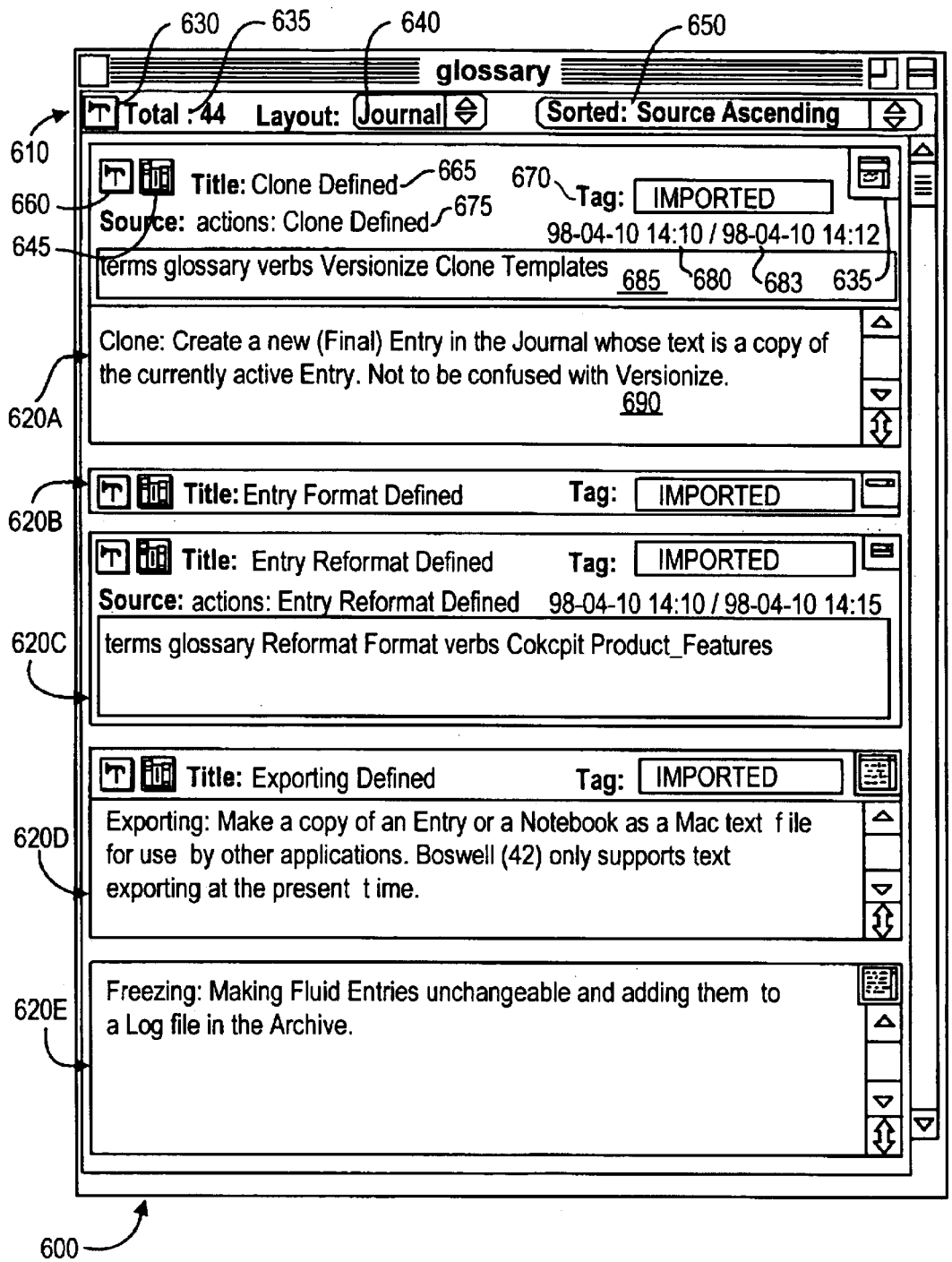
FIG. 6A illustrates a journal layout of a notebook window of a software application program, according to an embodiment of the present invention.
Figure 6B:
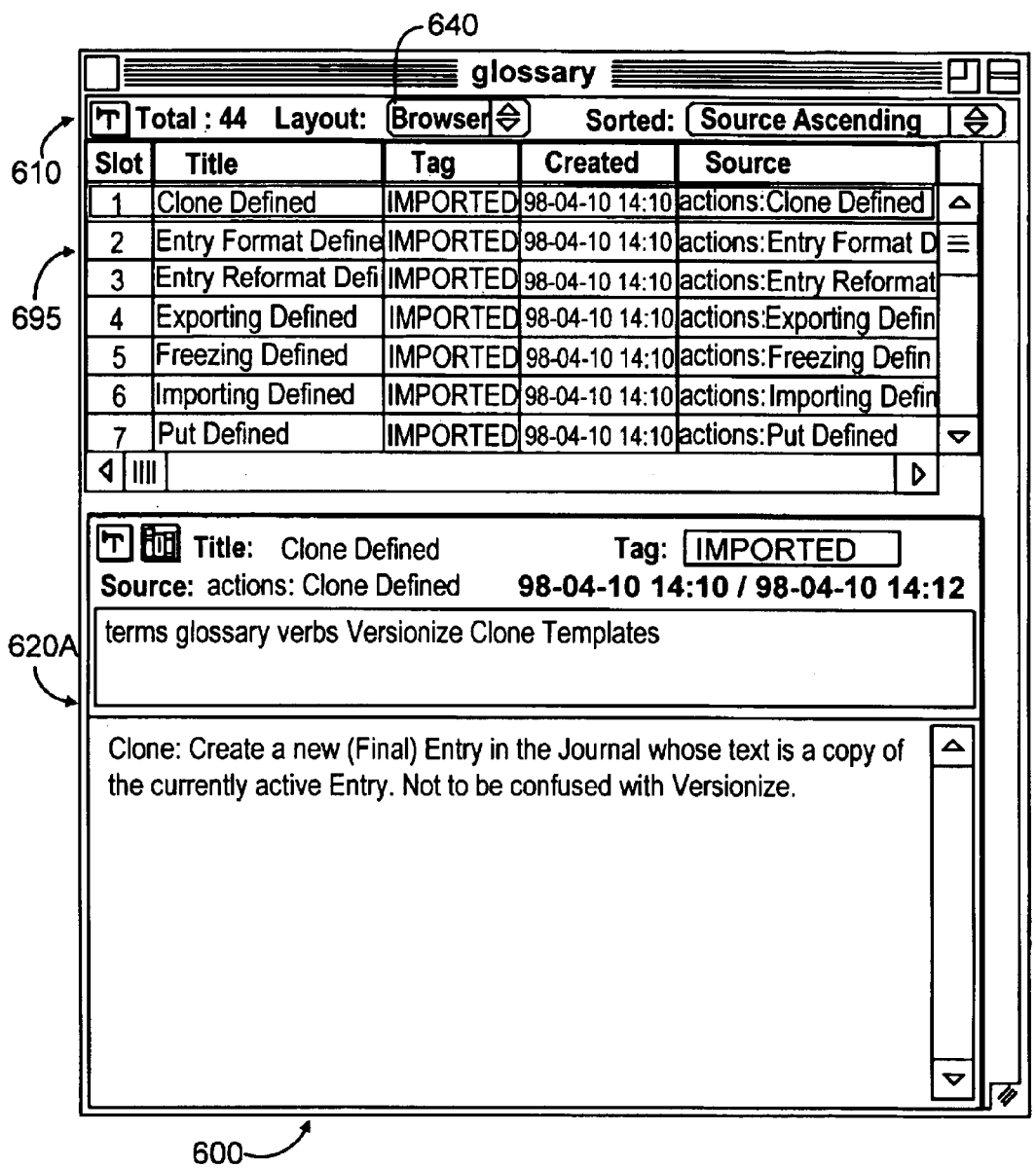
FIG. 6B illustrates a browser layout of a notebook window of a software application program, according to an embodiment of the present invention.

An operation 200 for selecting and manipulating non-modifiable data objects is described in FIG. 2. The non-modifiable data objects are first created as modifiable data objects, edited and then converted into non-modifiable data objects. The modifiable data objects can be created using any suitable technique known in the art including, but not limited to, importing data objects from an external file, generating data objects in a word processing, graphics or paint program or "copying and pasting" data objects from another application program via a "copy and paste" facility provided by an operating system. As those skilled in the art are familiar with these techniques, they are not further discussed herein. First, stage 210 determines whether a search is being performed on a set of non-modifiable data objects stored on the computer system, in which case operation 200 proceeds to parameter search stage 220. Otherwise the operation proceeds to stage 260. Each non-modifiable data object has content data, a unique identifier and meta-information used in the search. The content data can be text, image, video, audio, multimedia or any combination thereof. For example, in some embodiments, the non-modifiable data objects are implemented in HTML. In parameter search stage 220, the search parameters are specified by a user of the computer system, although those skilled in the art realize that the search parameters could also be supplied by an application program executed by the computer system. For instance, the search parameters may include the author of the source data object, a range of creation dates of the data objects, specific text data contained in the data objects, whether the data object is already referenced in some other list of references to data objects, etc. Stage 230 determines if any data objects satisfy the search parameters, in which case a reference to each of the matching data objects is created in stage 240. Otherwise operation 200 terminates. Stage 260 determines whether data objects are being selected, in which case operation 200 proceeds to stage 270. Otherwise, operation 200 terminates. In stage 270, one or more references to data objects are selected by a user and operation 200 proceeds to stage 280. Stage 280 then determines whether any of the reference are to be manipulated, in which case operation 200 proceeds to stage 250. Otherwise operation 200 terminates. Any references to the matching data objects are manipulated in stage 250. For example, a list of references to the matching data objects is displayed in a window of a software application program executed by the computer system. A user may then add or delete references from the list, perform a new search on the references contained in the list or sort the references in a particular order. Individual data objects, as well as information about the data objects, can be displayed in the same window as the list of references either by scrolling through the references or by clicking on a particular reference in the reference list, as shown in FIGS. 6A, 6B and 7.

Figure 3:
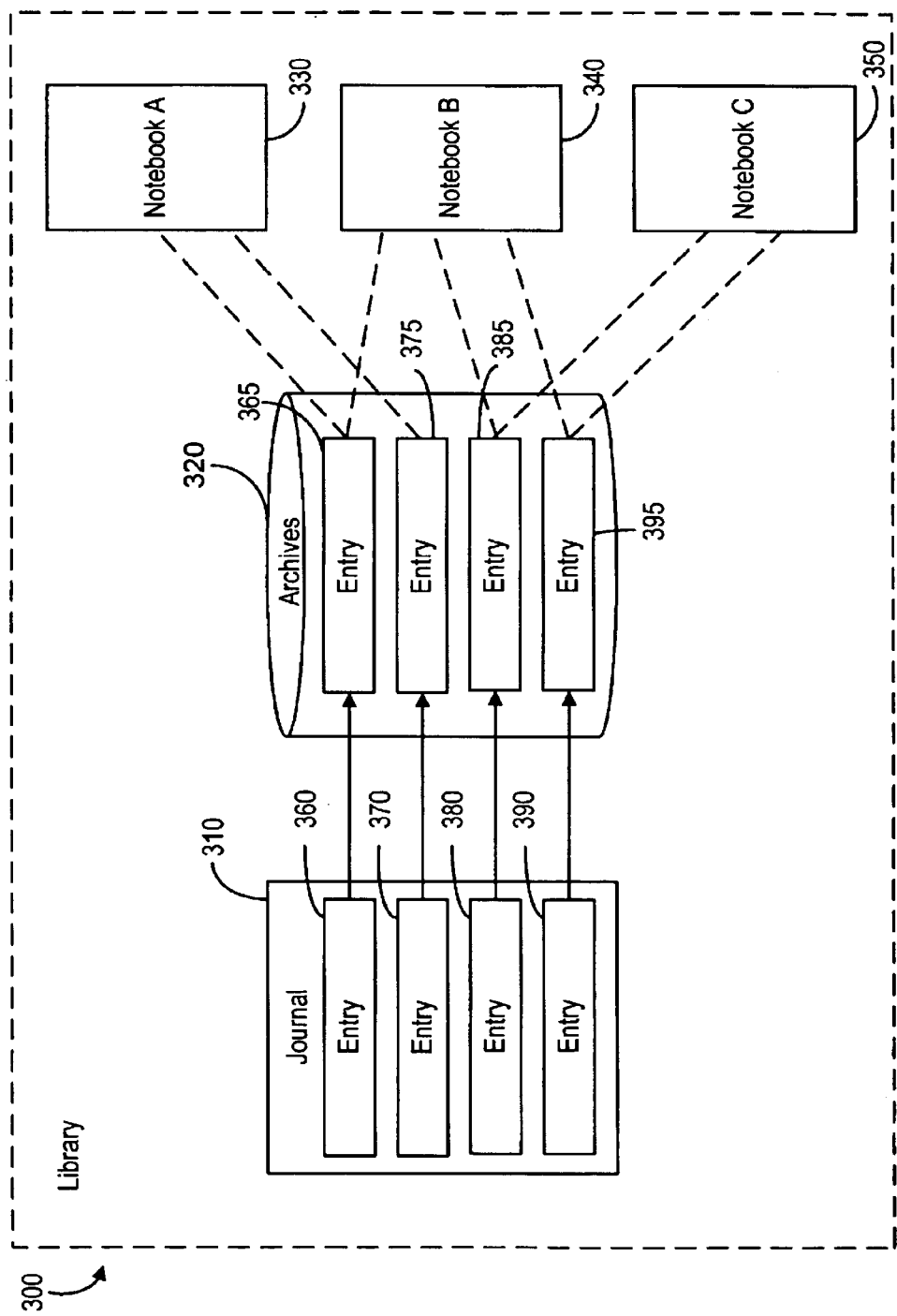
FIG. 3 illustrates the relationships among a library, an archive and several notebooks, according to an embodiment of the invention.

A computer system according to an embodiment of the invention is illustrated in FIG. 3. In FIG. 3, a library 300 includes a journal 310, archives 320 and notebooks 330, 340 and 350. Journal 310, in turn, has a plurality of journal entries 350, 360, 370 and 380. Journal entries 350, 360, 370 and 380 are data objects, according to an embodiment of the invention. The body of a journal entry can be created by any suitable technique known in the art. For example, text journal entries can be created by a word processing program executed by the computer system, image data entries can be created by a drawing program executed by the computer system, etc. Alternatively, journal entries can be created by inputting them directly into the computer system. For example, a text entry can be created by typing into a text pane of the computer system. An image data entry can be created by copying the image into a window pane of the computer system using the "cut and paste" function of an operating system such as the MACOS operating system.

Journal entries are typically fluid, in the sense that they can be modified at any time (e.g., by a user of the computer system). While journal entries are in a fluid state, they can only be accessed through the journal. Thus, adding entries to a journal is similar to a user having his/her own private electronic diary. Journal entries can be made available to other components of the system by storing them into archives 320. This process is referred to herein as "freezing" a journal entry. Once a journal entry is stored in archives 320, it becomes "frozen" and can no longer be modified. Thus, journal entries 360, 370, 380 and 390 are stored in archives 320 as frozen entries 365, 375, 385 and 395, respectively.

Furthermore, references to frozen entries 365, 375, 385 and 395 can be combined in notebooks 330, 340 and 350.

These references are referred to as notebook entries. Thus, as used herein, a notebook is simply a collection of references to frozen entries stored in archives 320. Only one reference to an entry is allowed in each notebook, even though two separate notebooks can each contain references to the same entry. In FIG. 2, for instance, notebook A 330 contains references to frozen entries 365 and 375, notebook B 340 contains references to frozen entries 365, 385 and 395, and notebook C 350 contains references to frozen entries 385 and 395.

Figure 4A:
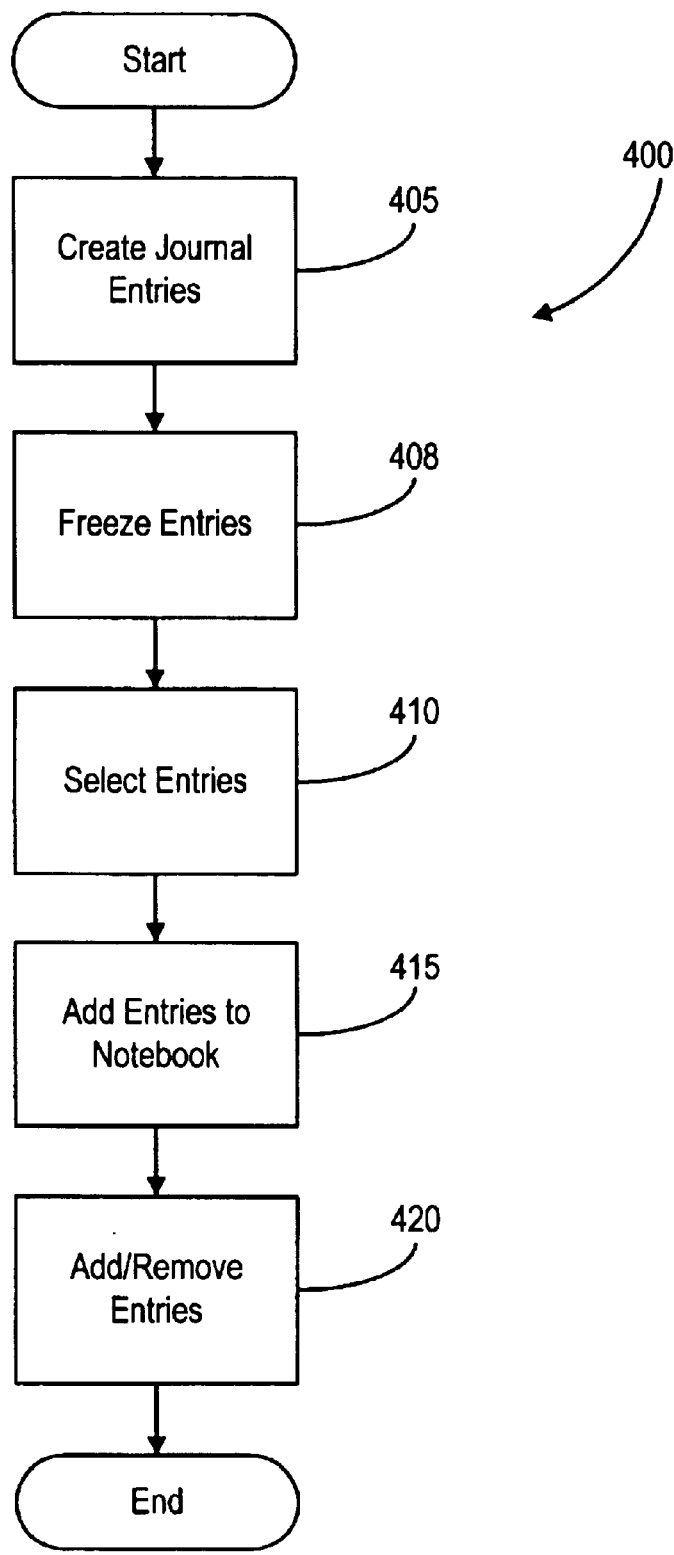
FIG. 4A is a flow diagram of a notebook manipulation operation, according to an embodiment of the invention.
Figure 4B:
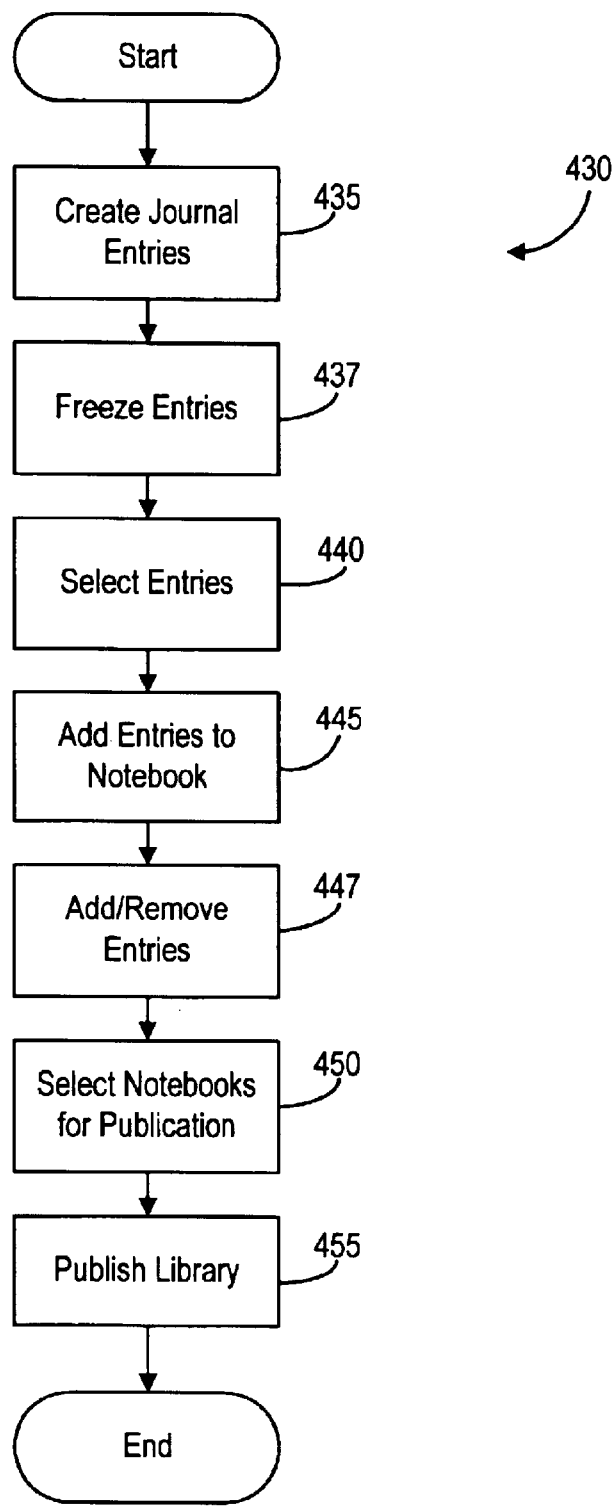
FIG. 4B is a flow diagram of a standalone library creation operation, according to an embodiment of the invention.
Figure 4C:
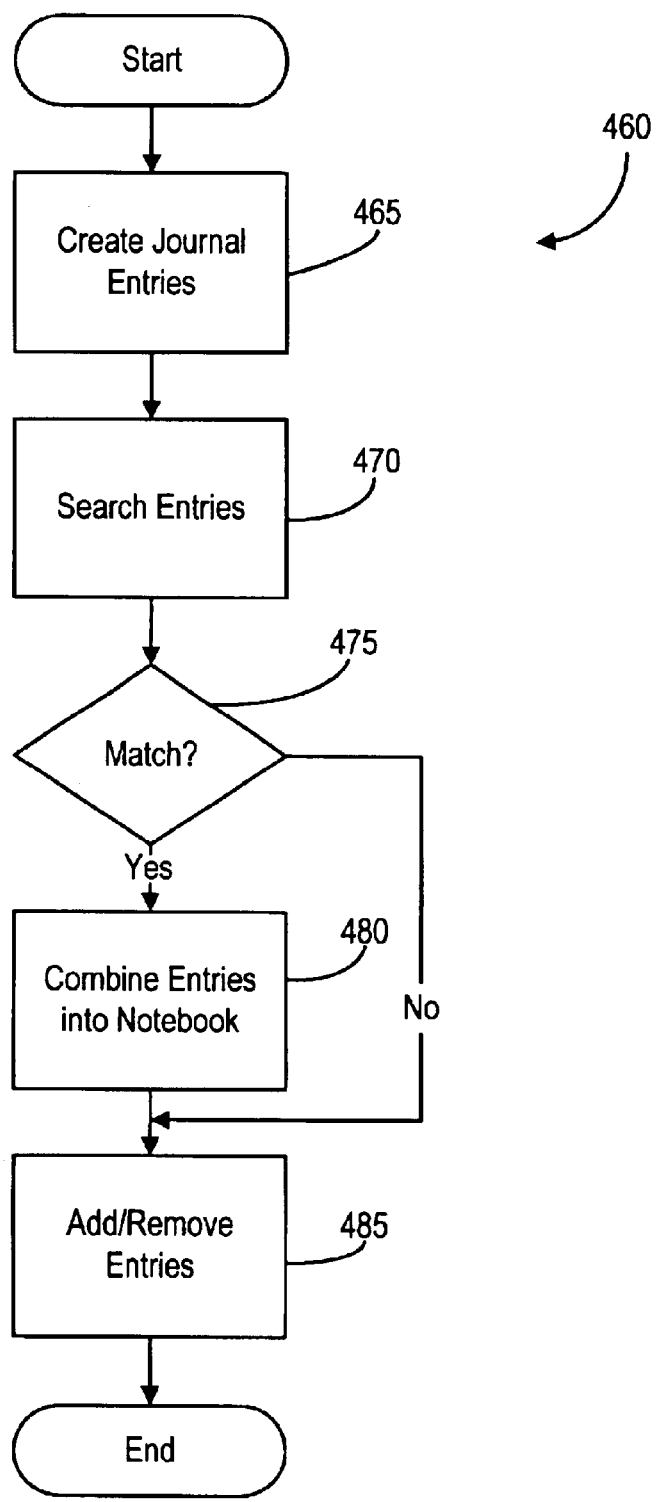
FIG. 4C is a flow diagram of a notebook manipulation operation, according to an embodiment of the invention.

FIGS. 4A–4C are flow diagrams of operations performed on the system of FIG. 3. FIG. 4A describes data object manipulation operation 400, according to an embodiment of the invention. Journal entries 360, 370, 380 and 390 (FIG. 3) are first created in stage 405 and then stored in archives 320 as frozen entries 365, 375, 385 and 395, in stage 408. Frozen entries 365, 375, 385 and 395 are then selected by a user for inclusion in a notebook (e.g., notebook A 330), in stage 410. In stage 415, a reference to the selected entries is created and added to the notebook. Finally, references are added to and/or removed from the notebook by a user, in stage 420.

FIG. 4B describes a standalone library creation operation 430, according to a further embodiment of the invention. Stages 435, 437, 440, 445 and 447 are analogous to stages 405, 408, 410, 415 and 420 of the operation of FIG. 4A. In stage 450, however, one or more notebooks are selected by the user for publication and, in stage 455, the selected notebooks and the corresponding entries in archives 320 are "published" by replicating the notebooks and the entries and storing the resulting copies as a non-modifiable collection of data objects and associated references in the computer system. The published library is referred to as a standalone library and the notebook entries contained in the standalone library cannot be modified. Furthermore, the standalone library does not provide a journal for adding entries to the archives. New entries cannot be added to the notebooks of the standalone library and existing notebooks cannot be modified.

FIG. 4C describes a data object manipulation operation 460, according to a further embodiment of the invention. Stage 465 is analogous to stage 405 in FIG. 4A. In stage 470, however, the frozen entries are searched according to a set of search parameters. Stage 475 then determines whether any of the frozen entries satisfies the search parameters, in which case the operation proceeds to stage 480. Otherwise, the operation proceeds to stage 485. In stage 480, references to the frozen entries satisfying the search parameters are created and, combined with the entries already stored in the notebook (e.g., if a reference to the frozen entry does not already appear in the notebook, a new notebook entry is added referencing the frozen entry). Finally, in stage 485, notebook entries are added to or removed from the notebook by a user.

Figure 4D:
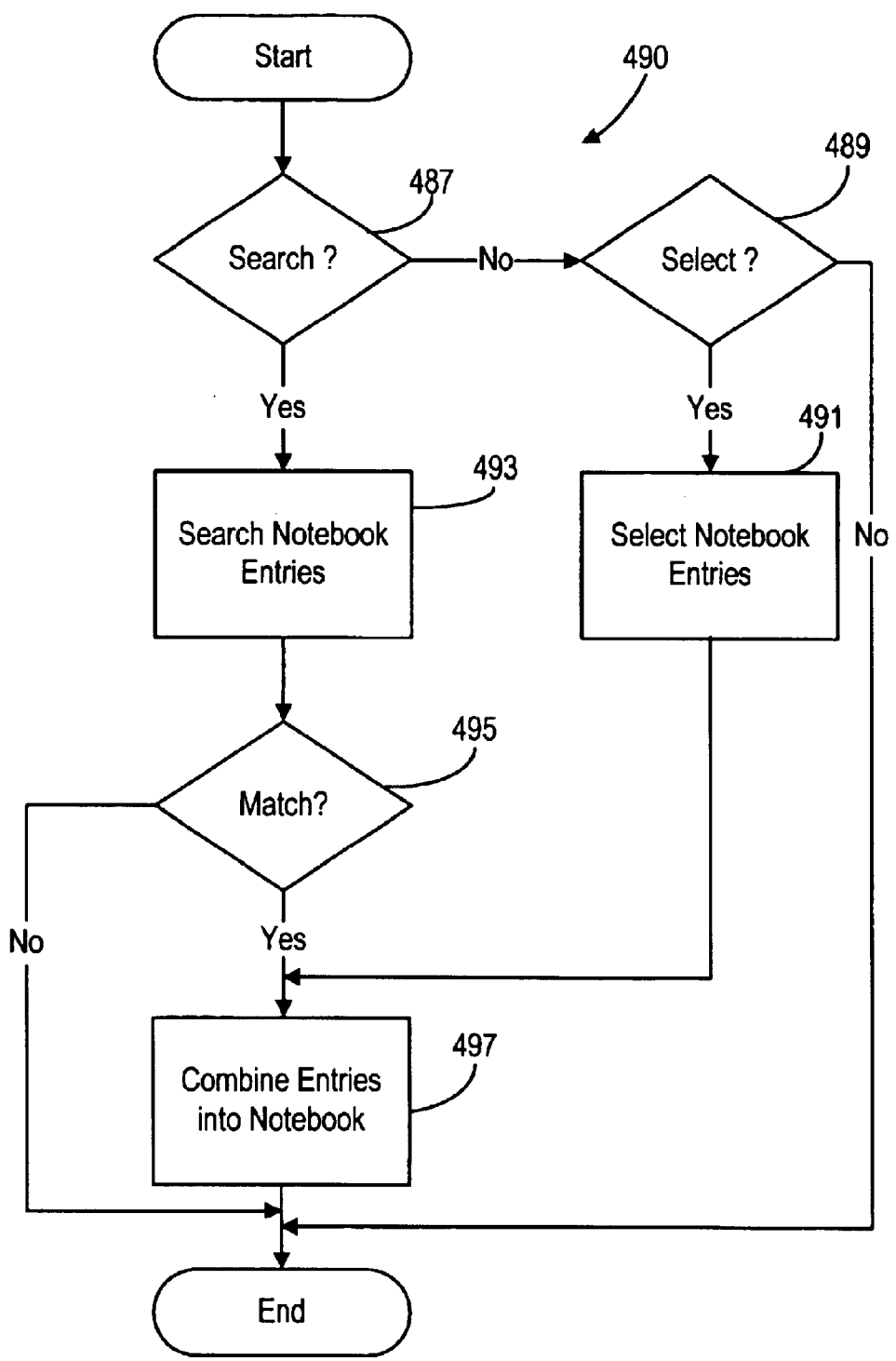
FIG. 4D is a flow diagram of a notebook entry duplication operation, according to an embodiment of the invention.

FIG. 4D illustrates a notebook entry duplication operation 490, according to an embodiment of the invention. In FIG. 4D, stage 487 first determines whether a search is being conducted, in which case operation 490 proceeds to stage 493. Otherwise, stage 489 determines whether a selection is being performed, in which case operation 490 proceeds to stage 491. Otherwise operation 490 terminates. The source notebook entries are searched in stage 493. Stage 495 then determines if any source notebook entries satisfy the search parameters, in which case operation 490 proceeds to stage 497. Otherwise operation 490 terminates. In stage 491, one or more source notebook entries are selected to be duplicated in one or more destination notebooks. Finally, in stage 497, the source notebook entries either selected in stage 491 or returned by a search in stage 493 are combined with the destination notebook entries (e.g., if a reference to the same data object is not already contained in the destination notebook, a new reference to the data object is created and added to the destination notebook) and operation 490 terminates.

A software application program in accordance to an embodiment of the invention and executed by a general purpose computer running under the MACOS operating system is now described in reference to FIGS. 5A–5E, 6A–6B and 7–8.

Figure 8A:
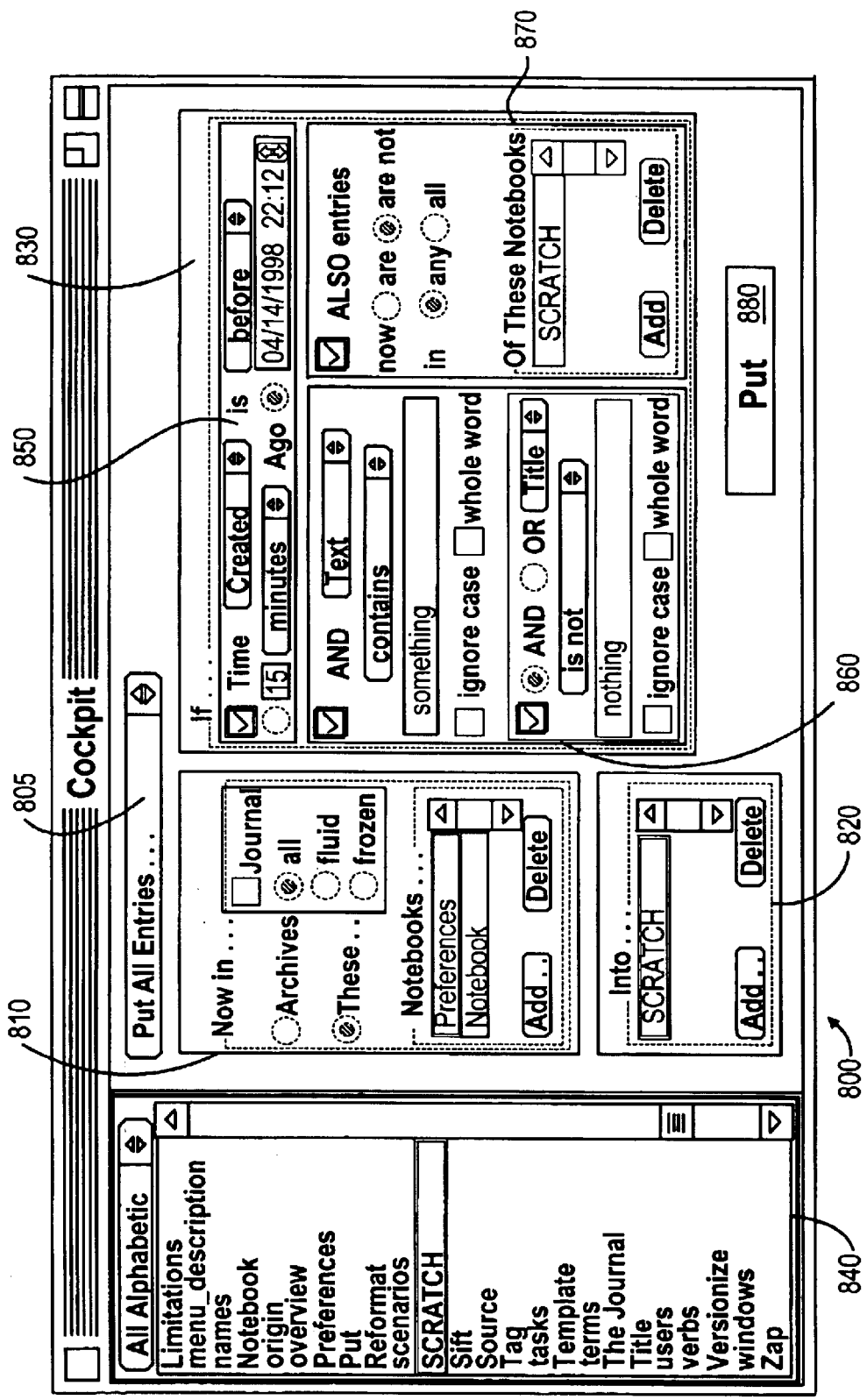
FIG. 8A illustrates a cockpit window of a software application program, according to an embodiment of the invention.
Figure 8B:
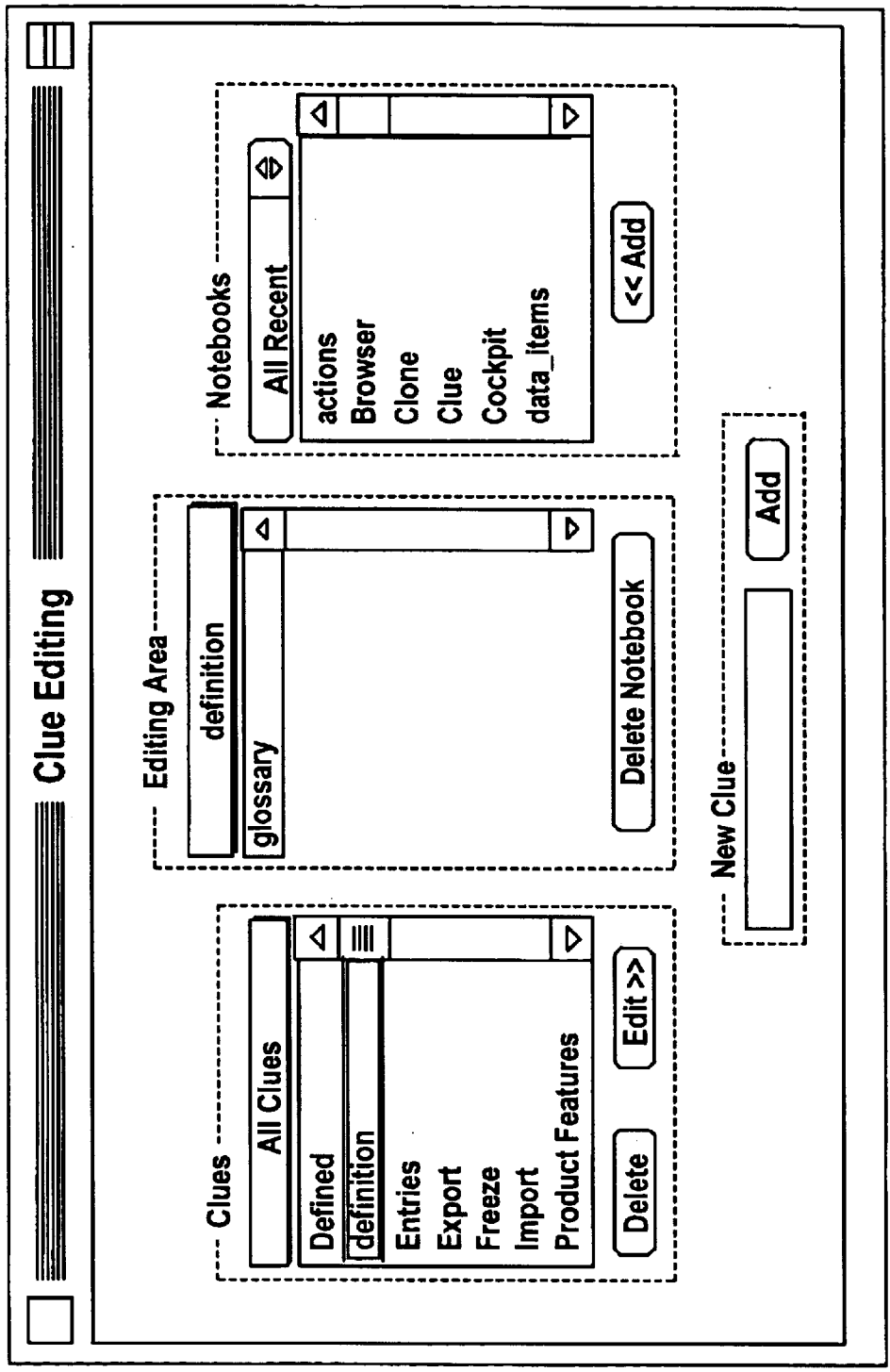
FIG. 8B illustrates a clue editing window of a software application program, according to an embodiment of the invention.

FIG. 5A illustrates the menu structure of the software application program. In FIG. 5A, menubar 505 has several pulldown menus: file menu 515, edit menu 525, text menu 535, manage menu 545 and notebook menu 547, in addition to the standard Apple menu common to most MACOS application programs. Each of the menus of menubar 505 provides access to one or more commands that can be performed by the software application program. For instance, file menu 515 contains commands to create, open, close and save a library, importing a file or a notebook, exporting a notebook (e.g., saving the frozen entries referenced by the notebook into a file) and printing the data objects referenced by a notebook on a printer connected to the computer system. In addition, file menu 515 provides access to standard MACOS operations to close the current active window, performing page setup for a document to be printed or quitting the current application program. Similarly, edit menu 525 provides access to standard formatting and editing commands supported by MACOS. Text menu 535 provides access to commands that determine the appearance of text characters displayed by the software application program. Manage menu 545, in turn, provides access to several commands to create a new entry or a new browser window (FIG. 7), open the cockpit window (FIG. 8A) or display a clues window (FIG. 8B). Finally, notebook menu 547 provides access to commands to create, open, delete or rename a notebook, as well as to sort notebook entries.

Figure 5B:
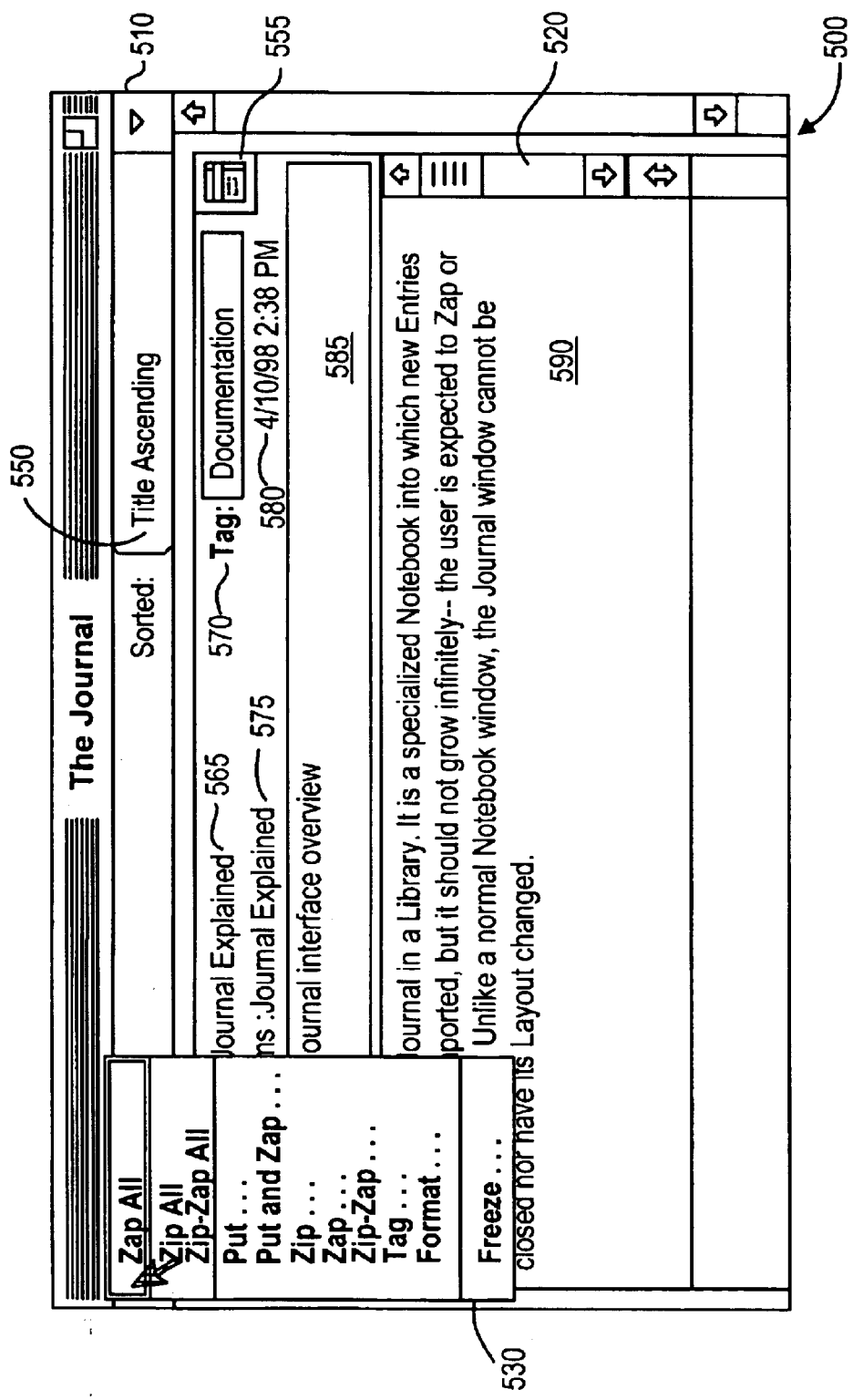
FIGS. 5B–5D illustrate several views of a journal window of the software application program, according to an embodiment of the invention.
Figure 5C:
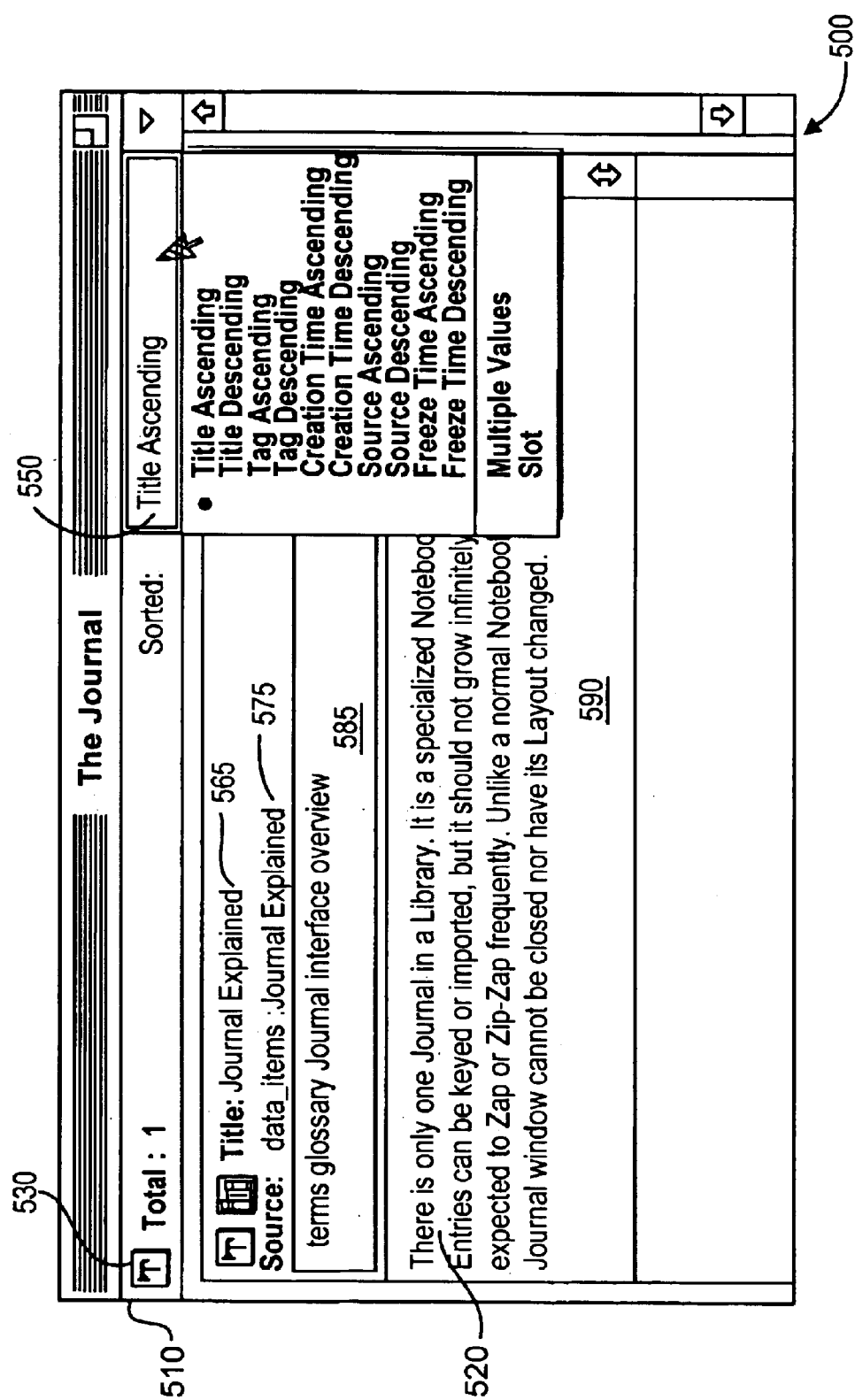
Figure 5D:
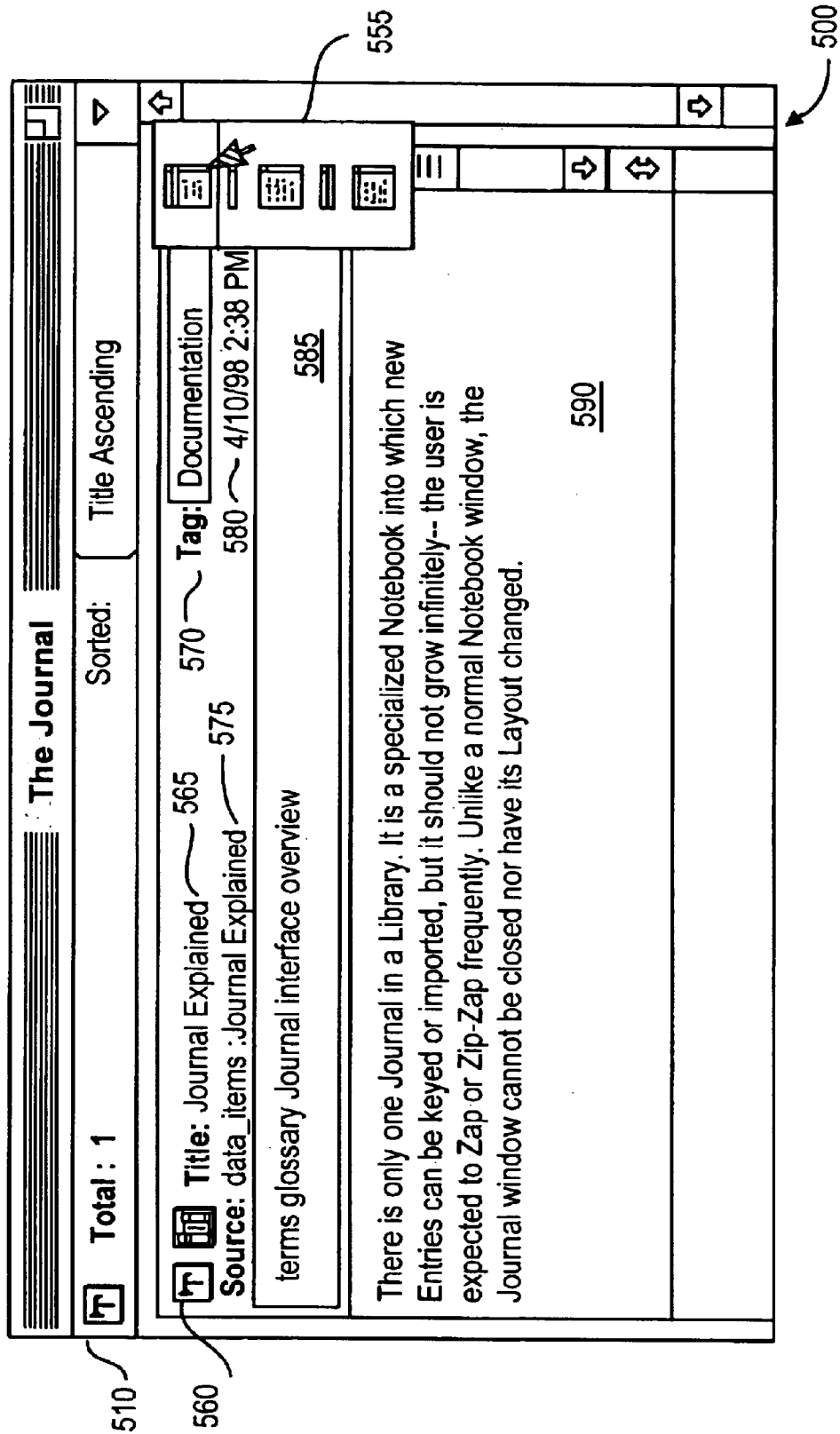

FIGS. 5B–5D illustrate a journal window 500 of the software program displayed on a screen of a monitor of the computer system. Journal window 500 includes a window header 510 and one or more entry panes 520. Window header 510 includes a command menu 530 and a sort menu 550. Command menu 530 controls commands to be performed on the entire journal, such as removing entries from the journal ("zap") and replicating entries in one or more notebooks ("put" and "zip"). Zip and put are both used to replicate entries in one or more notebooks, however, put requires that the destination notebooks be explicitly specified by the user. By contrast, zip provides a facility ("sifting") that allows users to automatically replicate notebook entries in a predetermined set of notebooks if a number of keywords ("clues") associated with the set of notebooks are found in the entries being zipped. For example, a user can create a clue such as "project x" to distribute all entries regarding project x to all notebooks concerning project x. During a zip operation, entries are sifted for the term "project x" and those entries containing "project x" are automatically replicated in all notebooks specified in the project x clue. Sort menu 550, in turn, controls the order in which the entry panes 520 are displayed in journal window 500. Entry panes 520 may scroll up or down to display more entry panes 520 than can physically be displayed in journal window 500 at any one time. As those skilled in the art are familiar with scrolling window techniques, they are not further discussed herein.

Each entry pane 520 includes a format menu 555, a entry command menu 560, a title text field 565, a tag text field 570, a source text label 575, a creation time label 580, a comment field pane 585 and a body pane 590. Title text field 565, tag text field 570, source text label 575, creation time label 580, and comment pane 585 are all searchable and siftable and are thus referred to as meta-information. Format menu 555 controls the display format of entry pane 520. Entry command menu 560 controls commands performed on the entry displayed in entry pane 520. Title text field 565 contains a user modifiable title identifying the entry. Typically, the title is assigned by the user creating the entry. Tag text field 570 contains a user modifiable tag field used to further identify the entry. Tag text field 570 is the only field that can still be modified after the entry is frozen (e.g., in a notebook entry). Source text label 575 is a non-modifiable text label identifying the source of the entry. Likewise, creation time label 580 is a text label indicating the creation time of the entry. Comments pane 585, on the other hand, is a free form text field that allows the user creating the entry to describe the contents of body text pane 590. Finally, body pane 590 is a free form text field that is used to store the body of the entry. In some embodiments of the invention, body pane 590 is used to store data other than text. For example, in some embodiments body text pane 590 stores text data, image data, video data, audio data or any combination thereof.

All entries displayed in an entry pane 520 of journal window 500 are initially fluid. A fluid entry is an entry that can be modified by the user and is, therefore, private to the journal (the entry cannot be referenced outside the journal, e.g., by a notebook). A fluid entry that is stored in archives 320 becomes a frozen entry. Once an entry is frozen it can no longer be modified by the user, even though it may still appear in journal window 500. A journal entry can be removed from journal window 500 by issuing a "zap" command. The zap command can be issued from entry command menu 560 of entry pane 520, from command menu 530 of journal widow 500 or from command menu 805 of cockpit window 800.

FIGS. 6A–6B illustrate a notebook window 600. Notebook window 600 (FIG. 6A) comprises a window header 610 and one or more entry panes 620A, 620B, etc., one for each entry of the notebook displayed in notebook window 600. Window header 610 includes a command menu 630, a total label 635, a layout menu 640 and a sort menu 650. Command menu 630 controls commands to be performed on the entire notebook, such as removing entries from the notebook or replicating the entry into other notebooks. Layout menu 640 controls the arrangement of entry panes 620A, 620B, etc. in notebook window 600. By selecting one of the layouts specified in layout menu 640 the user can cause notebook window to appear in either journal layout (FIG. 6A) or browser layout (FIG. 6B). Sort menu 650 controls the order in which entry panes 620A, 620B, etc. are displayed in notebook window 600. Entry panes 620A, 620B, etc. may scroll up or down within notebook window 600 in FIG. 6A. As those skilled in the art are familiar with scrolling window techniques, they are not further discussed herein.

Each entry pane 620A, 620B, etc. includes a command menu 660, a notebook menu 645, a title label 665, a tag field 670, a format menu 635, a source label 675, a creation time label 680, a freezing time label 683, a comment pane 685 and a body pane 690. Command menu 660 controls commands performed on the entry displayed in entry panes 620A, 620B, etc. When notebook menu 645 is activated, a list of notebooks containing the notebook entry displayed in entry pane 620A is displayed. The user can then display one of these notebooks by simply selecting the notebook name from notebook menu 645. Title label 665 identifies the entry displayed in entry pane 620A. Tag field 670 contains a user modifiable tag used to identify the entry displayed in entry pane 620A during searches and sorts. Format menu 635 controls which format entry panes 620A, 620B, etc. are displayed in. Note that each of entry panes 620A, 620B, 620C, 620D and 620E appears in a different format selected via format menu 635. Source label 675 is a non-modifiable text label identifying the source of the entry displayed in entry pane 620A. Likewise, creation time label 680 is a text label indicating when the entry displayed in entry pane 620A was created as a journal entry and freezing time label 683 is a text label indicating when the entry displayed in entry pane 620A was frozen. Comments pane 685, on the other hand, is a text field used to describe the contents of body pane 690. Finally, body pane 690 is a free form text field used to store the body of the entry displayed in entry pane 620A. In some embodiments of the invention, body pane 690 is used to store data other than text. For example, in some embodiments body pane 690 stores text data, image data, video data, audio data or any combination thereof.

When notebook window 600 appears in browser layout (FIG. 6B), a notebook entry list pane 695 is displayed between window header 610 and entry pane 620A. The user can then select any entry in notebook entry pane 695 for display in entry pane 620A by double clicking on the corresponding line of notebook entry list pane 695.

Note that since notebooks, unlike journals, contain only frozen entries title label 665, comments pane 685 and body pane 690 of entry pane 620A cannot be modified by the user. By contrast, title field 565, comments pane 585 and body pane 590 of entry pane 590 of FIG. 5B can be modified since the entry displayed in entry pane 590 is fluid. On the other hand, tag field 670 can still be modified even though the underlying data object is frozen. As a result, the user can enter any text in tag field 670 to aid in future searches or sorts of the notebook entries.

Notebook entries can be exported as text files. For example when an export menu command of command menu 660 is selected, the entry shown in entry pane 620A is stored as a text file in a location specified by the user. Those skilled in the art realize that a similar scheme can be devised to allow notebook entries to be imported from text files arranged in a predefined format. For example, text files could be imported as the body of a notebook entry. Alternatively, meta-information could be extracted from formatted data at a predefined location within the file.

FIG. 7 illustrates a browser window 700 that can be used to display notebook entries. Browser window 700 is similar to notebook window 600 in browser mode, except for the addition of a notebook list pane 710 and the elimination of layout menu 640. The user can thus access individual notebooks by double clicking on a corresponding line of notebook list pane 710.

Users of the application program can also manipulate notebooks by means of cockpit window 800, shown in FIG. 8. Cockpit window 800 includes a command menu 805, a source pane 810, a destination pane 820 and a filter pane 830. Filter pane 830, in turn, includes a time box 850, condition boxes 860 and 870 and a notebook list pane 840.

Command menu 805 controls the commands performed on the entries stored in library 300 (FIG. 3). Source pane 810 can be used to select specific notebooks for the command specified by command menu 805. Destination pane 820 specifies which notebooks the selected entries should be replicated to, if required by the command selected from command menu 805. Notebooks can be added to source pane 810 and destination pane 820 by dragging selected list items from notebook list pane 840 to source pane 810 or destination pane 820 or by pushing an "add" button. Notebooks can be removed from source pane 810 and destination pane 820 by selecting a corresponding line of the scrolling lists displayed in source pane 810 and destination pane 820 and pushing the corresponding "delete" button.

Finally, filter pane 830 allows the user to specify parameters to be used to limit the number of entries selected via source pane 810 that are to be transferred to the notebooks specified via destination pane 820, again, if required by the command selected from command menu 805. The operation specified via command menu 805 is triggered by pushing command button 880, whose appearance is modified to reflect the type of command selected via command menu 805.

To speed up searches, in some embodiments, the contents of frozen entries are indexed upon freezing. This is accomplished by creating an alphabetical list of the words contained in an entry being frozen and comparing the list to a master list of words contained in the entries already frozen in the library. The master list, in turn, contains separate lists for each word of references to frozen entries containing that word. When a word in the list for the entry being frozen is already contained in the master list, a reference to the entry is added to the reference list for that word in the master list. Otherwise, if the word is not already included in the master list, the word is added to the master list and a new reference list for that word is created having a reference to the entry being frozen. Those skilled in the art realize that other techniques for indexing entries can be used in place of the one described above. The invention is not limited to any particular indexing scheme and other indexing schemes other than the one described herein can be used in accordance to the principles of the present invention. Since once entries are frozen they can no longer be modified, there is no need to re-index the entries every time an entry is modified. As a result, the overhead associated with indexing the entries is minimized, while still allowing for fast searching of the frozen entries stored in a library.

FIG. 8B illustrates a clues editing window 890 that is displayed in response to a user selecting the clues command from manage menu 545 (FIG. 5A). Clue editing window 890 allows the user to add, delete or edit clues. Clues allow the user to associate one or more notebooks with a specific name or acronym (the "clue"). When the clue is used either in the header or in the body of a journal or notebook entry and a zip command is issued, the entry is sifted and automatically added to the notebooks associated with the clue. The zip command is analogous to the put command, except that destination notebooks are not explicitly defined by means of put window 895 (FIG. 8C), but are determined according to the clues contained within the entry. Thus, the user can use the zip command to distribute entries to notebooks associated with certain topics specified by the clues without having to explicitly select the notebooks.

Furthermore, repetitive tasks like zipping and zapping all journal entries at the end of the day can be automated by using a feature of the application program known as "chores." Chores allow a user to specify a certain operation to be performed at fixed intervals of time by the application program without requiring further user interaction. The user, of course, can cancel a chore when it is no longer needed.

Figure 8C:
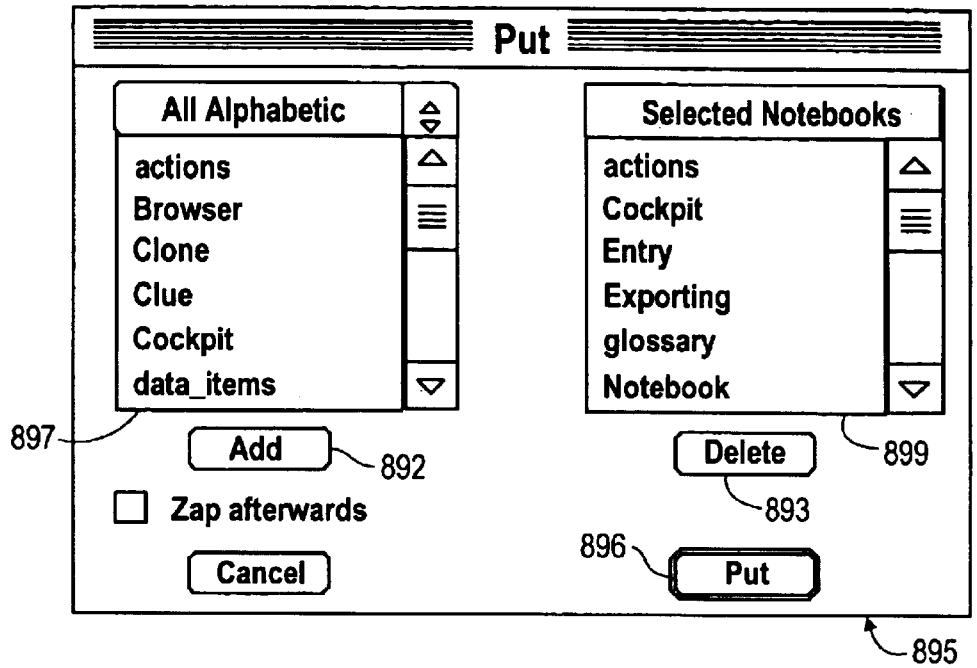
FIG. 8C illustrates a put window of a software application program, according to an embodiment of the invention.

FIG. 8C illustrates put window 895 that is displayed when the put command is selected from command menu 805, or when a put command is selected using the command menu of a notebook or journal entry. Put window 895 allows the user to specify which notebooks the selected entries are to be distributed to. For the user's convenience, a notebook list pane 897 is provided which contains a listing of all available notebooks. Notebooks can be added or deleted from selected notebook list 899 by pushing add button 892 or delete button 893. The put command is triggered by pushing put button 896.

Figure 9A:
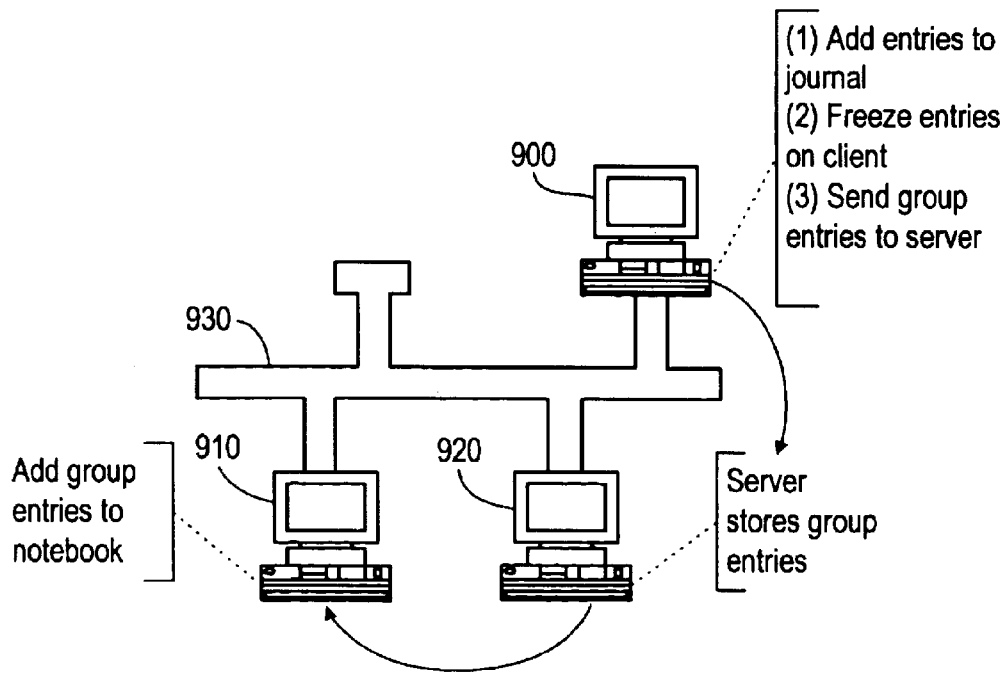
FIG. 9A illustrates computers connected to a local area network, according to an embodiment of the invention.
Figure 9B:
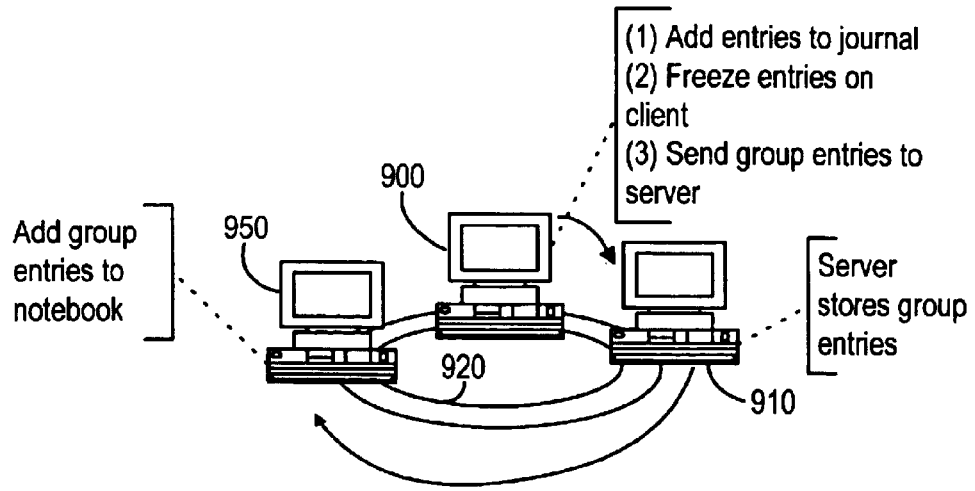
FIG. 9B illustrates computers connected to a wide area network, according to an embodiment of the invention.
Figure 9C:
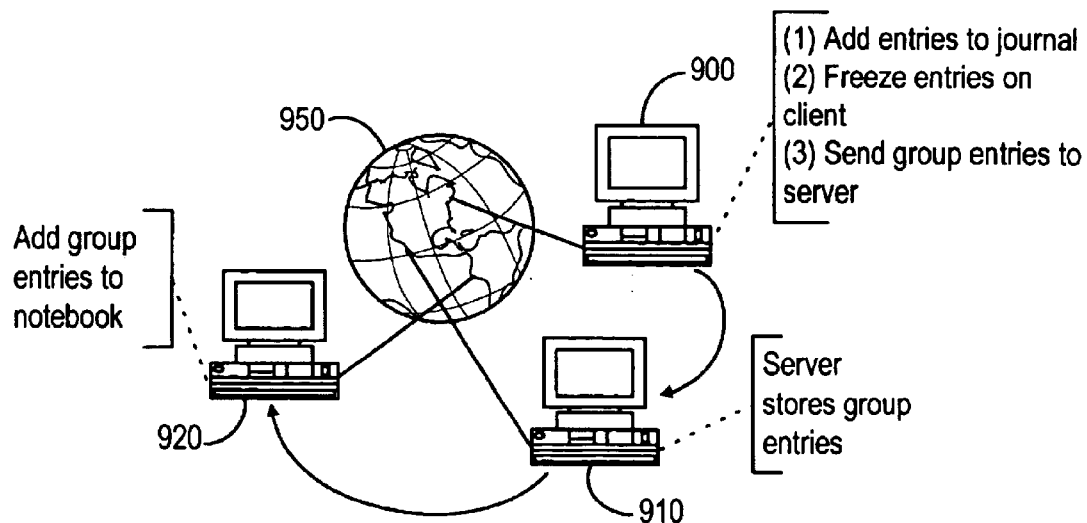
FIG. 9C illustrates computers connected to a global network, according to an embodiment of the invention.

According to one embodiment of the invention, journal entries are created on a first client computer connected to a network, selected journal entries are added to the archive on the first computer, stored in the archives of a group library stored on a server computer connected to the network, and forwarded to the archives of a second client computer also connected to the network. FIGS. 9A–9C illustrate these operations when the computers are connected to a local area network, a wide area network and a global area network, respectively.

In FIG. 9A, general purpose computers 900, 910 and 920 are connected to a local area network 930 and execute an information system program according to an embodiment of the invention, such as the one described in reference to FIG. 3. Local area network 930 is any suitable local area data communications network known in the art. A user of general purpose computer 900 creates journal entries, as described in reference to FIGS. 5B–5D. The user then freezes the entries by storing them in the archives of general purpose computer 900, as described in reference to FIG. 3. Copies of all entries selected for distribution by the user are then transferred over local area network 930 to general purpose computer 920, where they are stored in the archives of the group library. A user of general purpose computer 930 then receives copies of the frozen entries stored in the group library of general purpose computer 920, storing them in his/her library.

In some embodiments, a general purpose computer is designated as a central repository for entries published by all users connected to the network and then distributes copies to the archives of individual computers while in others the central repository can be located on one of the individual computers. Other techniques for data distribution and broadcasting known in the art may be used according to the principles of the invention. As those skilled in the art are familiar with these techniques, they are not further discussed herein.

In FIG. 9B, general purpose computers 900, 910 and 920 are connected to a wide area network 940 and execute an information system program, according to an embodiment of the invention, such as the one described in reference to FIG. 3. Wide area network 940 is any suitable wide area data communications network known in the art. Entries are created and distributed over wide area network 940 in a manner analogous to the one described with reference to general purpose computers 900, 910 and 920 of FIG. 9A.

In FIG. 9C, general purpose computers 900, 910 and 920 are connected to a global network 970 and execute an information system program, according to an embodiment of the invention, such as the one described in reference to FIG. 3. Global network 970 is any suitable wide area data communications network known in the art. Entries are created and distributed over global network 970 in a manner analogous to the one described with reference to general purpose computers 900, 910 and 920 of FIG. 9A.

Figure 10:
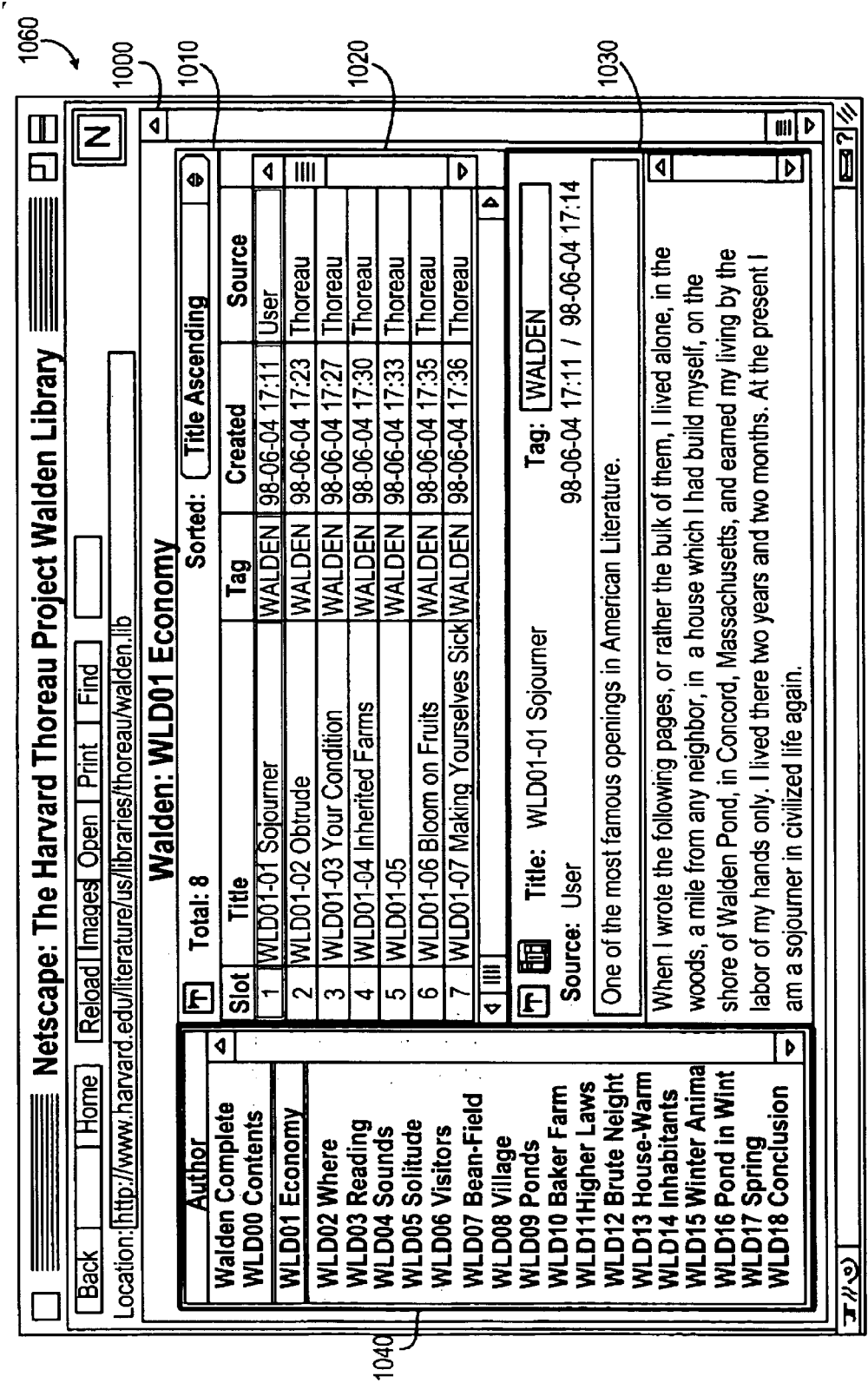
FIG. 10A shows a window of a software application program that allows a user to access data entries stored in a standalone library.
FIG. 10B shows a window of a software application program that allows a user to access data entries stored in a standalone library over a global network.

FIG. 10A shows a window 1000 of a software application program that allows a user to access a standalone library.

Window 1000 has a browser header 1010, an entry list pane 1020, an entry pane 1030, an author notebook list 1040 and a reader notebook list 1050. Browser header 1010, entry list pane 1020, entry pane 1030 perform the same functions as the corresponding elements of browser window 700 (FIG. 7). Author notebook list 1040, on the other hand, provides access to notebooks created by the author of the standalone library prior to the publication of the standalone library. Reader notebook list 1050, provides access to notebooks created by the user after the publication of the standalone library. As a result, notebooks accessed through author notebook list 1040 cannot be modified by the user, while notebooks accessed through reader notebook list 1050 can be modified by the user.

FIG. 10B shows window 1000 displayed within a pane of web-browser window 1060. Web-browser window 1060 is a window of a web-browser application program such as NETSCAPE NAVIGATOR, available from Netscape Communications Corp. of Mountain View, Calif., or INTERNET EXPLORER, available from Microsoft Corp. of Redmond, Wash., that allows users to access and view web-pages over the Internet. Window 1000 is displayed within a pane of web-browser window 1060 by means of a plug-in extension to the web-browser application program that allows standalone libraries to be accessed and viewed over the Internet by accessing a URL of a computer on which the standalone library is residing.

FIG. 11 shows window 1060 of a software application program that allows a user to access libraries stored on one or more server computers connected to a client computer via the Internet, as shown in FIG. 9C.

Figure 12:
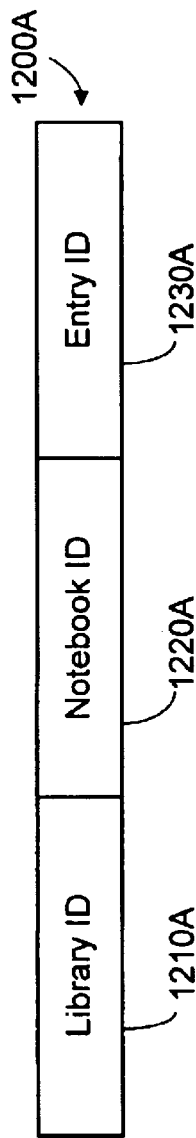
FIGS. 12A illustrates the elements of a reference to a data object.
FIG. 12B illustrates specific values of the elements of a reference to a data object.
FIG. 12C illustrates the values of the elements of a reference to a data object in the special case of a data object that is not referenced in any notebook.
Figure 12:
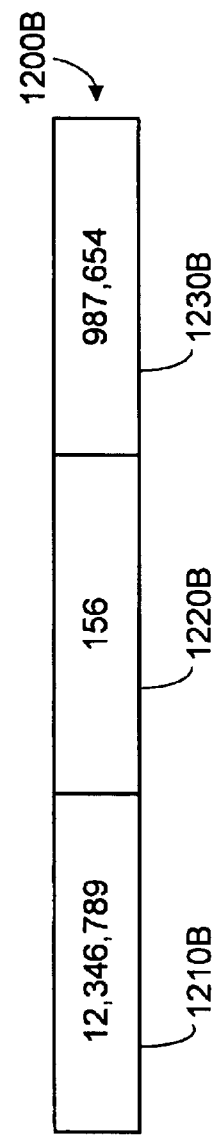
Figure 12:
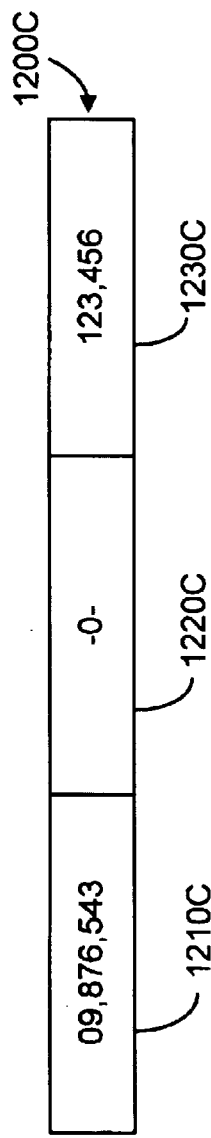

Pane 1100 has a browser header 1110, an entry list pane 1120, an entry pane 1130, an author notebook list 1140 and a reader notebook list 1150 that perform analogous functions to those of browser header 1010, entry list pane 1020, entry pane 1030, author notebook list 1040 and reader notebook list 1050 of FIGS. 10A–10B. However, library list 1160 allows a user of the software application program to select a particular standalone library or hyper-library among a list of libraries stored on server computers connected to the client computer via the Internet. A hyper-library is similar to a standalone library, except that the author can always add new entries and notebooks to the hyper-library. A user of the application program of FIG. 11 can thus access any library stored on a computer connected to the Internet, regardless of whether the library is a standalone library or a hyper-library. Furthermore, references to data objects in separate libraries stored on server computers can be combined in a single notebook by a user of client computer connected to the server computers via the Internet. These notebooks comprise a local library that is private to the user (e.g., the USER library of FIG. 11). The entries contained in a library stored on a server can be viewed by first selecting the library from library list 1160 and then clicking on a line of entry list 1120. The contents of the corresponding entry are thus displayed in entry pane 1130. The user can also search the entries in one or more libraries by using cockpit window 800 (FIG. 8A), create reader's notebooks and add/remove entries from the reader's notebooks. Author's notebooks, on the other hand, cannot be modified by the user. The application program of FIG. 11 can thus function as a search engine for data objects stored on computers connected to the Internet. The results of the search comprise a listing of references 1200A to data objects that include a library ID 1210A, a notebook ID 1220A and an entry ID 1230A, as shown in FIG. 12A. FIG. 12B shows the values of library ID 1210B, notebook ID 1220B and entry ID 1230B of reference 1200B for the notebook entry selected in FIG. 11. As shown in FIG. 12C, when a frozen entry in a library is not referenced in any notebook, notebook ID 1220C has a special value, such as —0— to indicate that the frozen entry is not referenced in any notebook.

An example is now provided of the operation of the various application programs described above. In the example, the application program of FIGS. 5A–8C is referred to as Personal Archive Librarian (PAL), the application program of FIGS. 9A–9B is referred to Group Archive Librarian (GAL), the application program of FIGS. 10A–10B is referred to as Standalone Archive Librarian (SAL) and the application program of FIG. 11 is referred to as Hyper Archive Librarian (HAL).

In the example, a three-person team is working on a project, but each teammember is located in a different office. Each teammember has a computer equipped with PAL, GAL, SAL and HAL. The computers are connected via the Internet. A Central Project Library (CPL) is created on a server computer equipped with GAL. The CPL has a unique library ID 1210. Each teammember is registered as a user of the CPL by providing GAL with the library ID of the teammember's PAL library. A list of clues, agreed upon by the teammembers, is maintained on each teammembers' PAL together with a Project Notebook (PN). Each teammember periodically zips his/her journal entries. Entries containing any of the clues for the project are automatically added to the PN. Alternatively, a chore can be set up to automatically zip new entries at fixed time intervals. Once a day, GAL then sends a message to the PALs of each teammember registered as a user of the CPL requesting that all new notebook entries in the PNs be sent to GAL. The entries are thus imported into the CPL. GAL then exports to each teammember's PAL all new entries that were not created by that teammember. The entries are then imported into each teammember's PAL journal. At the end of this operation each teammember has a copy of all notebook entries pertaining to the project that are stored in the CPL, regardless of the author.

At some point, one of the teammembers is asked to teach a class on a new technology developed by the project. The teammember then searches the CPL for all entries related to the new technology and saves them in several notebooks dealing with different aspects of the new technology. When the teammember is satisfied that all the relevant entries have been included in the notebooks, he/she exports the notebooks and the corresponding entries into a standalone library (SL) about the new technology. During the course, each of the teammember's students has a computer equipped with SAL and a copy of the SL. The students can add new notebooks to their own SL, for example to organize the entries about a particular class.

Finally, once the project is completed, the teammembers decide to make both the SL and other portions of the CPL available to the public to promote the new technology. This is accomplished by exporting the desired portions of the CPL and importing them into HAL as an hyper library (HL). The HL has its own http address and can be accessed over the Internet by users equipped with HAL. A user could then search the HL, as well as other libraries (including both standalone libraries and hyper-libraries) accessible over the Internet, to create his/her own notebooks on the new technology.

MACOS is a registered trademark of Apple Computer, Inc. of Cupertino, Calif., NETSCAPE NAVIGATOR is a registered trademark of Netscape Communications Corp. of Mountain View, Calif. and INTERNET EXPLORER is a registered trademark of Microsoft Corp. of Redmond, Wash.

Embodiments described above illustrate but do not limit the invention. In particular, the invention is not limited by any number of journals or notebooks manipulated by the computer system, or by any particular hardware or software implementation. Furthermore, the invention is not limited by the format of the journal window, the cockpit window or the notebook window shown in the drawings and described in the specification. Other window formats or other user interface techniques known in the art can be used in accordance to the principles of the invention. The invention is also not limited to any number of computers connected to a network, or to any particular network implementation. Any suitable technique for computers to share information over a network can be used according to the invention. Other embodiments and variations are within the scope of the invention, as defined by the following claims.

What is claimed is:

1. A method for accessing, viewing and manipulating data stored in a computer system having one or more computers, the method comprising:

storing a set of entries in a permanent archive on one of the computers of the computer system;

storing a collection of references to one or more of the entries in a notebook on one of the computers;

displaying the collection of references and one or more of the entries in a window of one of the computers; and manipulating the collection of references in the notebook.

2. The method of claim 1, wherein each of the references further comprises a modifiable tag field.

3. The method of claim 2, wherein each of the data objects contains a searchable comment field and a searchable tag field.

4. The method of claim 1, further comprising storing the entries in the archive as a collection of non-modifiable data objects.

5. The method of claim 4, wherein the non-modifiable collection of data objects is created on a first computer and the method further comprises adding a plurality of references to data objects stored in the non-modifiable collection of data objects to a second collection of references stored on a second computer, such that access to the non-modifiable data objects corresponding to references in the second collection of references is provided by the notebook and access is denied to the journal.

6. The method of claim 5, wherein the collection of references to the entries are created by more than one search of the entries.

7. The method of claim 1, wherein a reference to a single entry is contained in more than one collection of references.

8. The method of claim 1, wherein the references in the collection of references are organized in a user-modifiable order.

9. The method of claim 1, wherein each data comprises a unique identifier, one or more fields of meta-information and freeform content.

10. The method of claim 9, wherein the meta-information is used in searching the entries and is displayed on the window of the computer system together with the contents of the entry.

11. The method of claim 10, further comprising automatically adding references in the first collection of references to the second collection of references.

12. The method of claim 14, wherein the network is selected from the group consisting of: a local area network, a wide area network, a global network, and the internet.

13. The method of claim 11, further comprising a third computer, wherein the entries are created in a journal on the third computer.

14. The method of claim 1, wherein one or more entries are selected from the group consisting of: text data, image data, audio data, and multimedia data.

15. The method of claim 14, wherein the search parameters are automatically sifted by comparing a text portion of the entries to a list of predetermined text segments to determine whether one or more of the text segments occur within a text portion of the entries.

16. The method of claim 15, wherein the predetermined text segments are used in successive sifting operations.

17. The method of claim 13, wherein the entries in the permanent archive are retrieved only through the corresponding reference in one of the notebooks.

18. The method of claim 1, further comprising identifying a set of group entries from the set of entries;

automatically forwarding the set of group entries to the permanent archive; and automatically forwarding references to the set of group entries to one or more computers associated with the group.

* * * * *